United States Patent [19]

Goodings et al.

[11] Patent Number: 5,377,192
[45] Date of Patent: Dec. 27, 1994

[54] RADIO DATA COMMUNICATION SYSTEM HAVING MEANS FOR REDUCING COLLISIONS BETWEEN CONTENDING REMOTE STATIONS

[75] Inventors: Rupert Leslie A. Goodings; Leigh Carter; Patrick Mitchell, all of Cambridge, Great Britain

[73] Assignee: Cognito Limited, West Yorkshire, United Kingdom

[21] Appl. No.: 867,680
[22] PCT Filed: Nov. 13, 1991
[86] PCT No.: PCT/GB91/01998
§ 371 Date: Aug. 7, 1992
§ 102(e) Date: Aug. 7, 1992
[87] PCT Pub. No.: WO92/09148
PCT Pub. Date: May 29, 1992

[30] Foreign Application Priority Data

Nov. 13, 1990 [GB] United Kingdom .................. 9024684

[51] Int. Cl.⁵ .............................................. H04J 3/16
[52] U.S. Cl. .............................. 370/95.3; 370/110.1; 455/32.1
[58] Field of Search .......... 370/85.2, 85.7, 85.8, 370/85.1, 94.2, 110.1, 104.1, 95.1–95.2, 95.3, 94.1; 340/825.07, 825.08; 455/54.1, 38.3, 38.1, 34.2, 38.2, 34.1

[56] References Cited

U.S. PATENT DOCUMENTS

| 4,736,371 | 4/1988 | Tejima et al. | 370/94.1 |
| 4,742,512 | 5/1988 | Akashi et al. | 370/104.1 |
| 4,809,268 | 2/1989 | Tejima et al. | 370/95.2 |
| 4,940,974 | 7/1990 | Sojka | 340/825.08 |
| 4,947,451 | 8/1990 | Nawata | 370/95.1 |
| 5,124,985 | 6/1992 | Hoshikawa | 370/95.1 |
| 5,166,675 | 11/1992 | Amemiya et al. | 370/85.8 |
| 5,172,375 | 12/1992 | Kou | 370/104.1 |

FOREIGN PATENT DOCUMENTS 0228709 7/1987 European Pat. Off. .
WO89/06884 7/1989 WIPO .

OTHER PUBLICATIONS

"Teleterminal System", *38th IEEE Vehicular Technology Conference*, Jun. 1988, By M. Wakao et al., pp. 92–99.

"Satelite Databanks Using Packet Reservation and Combined FDMA-TDMA Technique", International Conference on Communications, vol. 2, Jun. 1983, By B. Jabbari et al., pp. 928–931.

*Primary Examiner*—Wellington Chin
*Assistant Examiner*—Chau T. Nguyen
*Attorney, Agent, or Firm*—Young & Thompson

[57] ABSTRACT

A radio based communication system comprises a base station (1) and one or more remote stations (2) each incorporating a radio transmitter and receiver to support communication between the base station and each remote station on a down link and between each remote station and the base station on an up link. Each link comprises a plurality of frames of fixed length divided into a fixed number of slots. The base station includes a base control which transmits control data in a general control slot (GC) in each frame of the down link so as to identify to each remote station a down-setup slot (DSU) in each frame of the down link in which the base station (1) is to announce the transmission of data for it and identify at least one down-transfer slot (DTR) in the frame of the down link in which the data is to be transmitted. The control data further identifies an acknowledgement slot (ACK) in each frame of the down link and an up-setup slot (USU) divided into sub-slots (1/4) in each frame of the up link. Each remote station (2) includes a remote control which transmits a request to transmit data to the base station (1) in any sub-slot (1/4) of the up-setup slot (USU) and receives corresponding data in the acknowledgement slot (ACK) of the down link to identify an up-transfer slot (UTR) in the up link in which it is to transmit data to the base station.

14 Claims, 22 Drawing Sheets

RADIO DATA COMMUNICATION SYSTEM HAVING MEANS FOR REDUCING COLLISIONS BETWEEN CONTENDING REMOTE STATIONS

TECHNICAL FIELD

This invention relates to a method of and a system for communicating data, in particular communicating data across a radio based communication system.

DISCLOSURE OF THE INVENTION

The present invention consists in a method of communicating data over a radio based communication system between a base station and one or more remote stations wherein the data is transmitted between the base station and each remote station in a down link comprising one or more down time-frames of fixed length, and data is transmitted between each remote station and the base station in an up link comprising one or more up time-frames of fixed length, each down frame comprising a fixed number of down slots at least one of which is a general control slot, at least one other is a down-setup slot, at least one other is a down transfer slot, and at least one other is a down acknowledgement slot, control data in the general control slot serving to identify to each remote station the down-setup slot in which the base station is to announce the transmission of data for it and identify the down-transfer slot or slots in which said data is to be transmitted, and each up frame comprising a fixed number of up sloes at least one of which is identified by control data in the general control slot as an up-setup slot, at least one other is an up transfer slot, and at least one other is an up acknowledgement slot, the up-setup slot being divided into a number of sub-slots in which each remote station can transmit a request to transmit data to the base station, and the base station serving to respond to such a request in a down acknowledgement slot by identifying the up transfer slot or slots in which the remote station is to transmit said data.

The communication of data on the down link and up link involves two phases: a setup phase and a data transfer phase, with a separate slot or group of slots, i.e. data channels, being allocated for each phase. The advantage of this technique is that the data transfer channel need not be loaded with data unless the setup phase is successful, and the setup messages can be very short and hence use very little bandwidth. This is especially advantageous for transmissions on the up link, since the remote stations, which may be a mobile fleet of users, are necessarily uncoordinated and will therefore contend for channel capacity. Contention channels, whether operating in Aloha- or CSMA- type modes, have to be operated at low utilisations to avoid instability. By ensuring that contentions take place only between short setup messages, even though the contention time-slots have to be operated at low utilisation, this has little impact on the overall efficiency of channel usage. The base station responds to a successful up-setup request by allocating capacity on a data transfer channel, which thereby may be operated in a "scheduled" manner at high utilisation. Similarly, as packets arrive at a base station to be transmitted to a particular remote station, the base station first executes a down-setup to tell the remote station to monitor the down data transfer channel, then schedules the data itself into the down data transfer channel.

Preferably, all data transmitted in the down transfer slot is labelled with a mobile group label by which it is identified by the remote station or stations to which it is addressed.

The down-setup slot contains data which identifies the mobile or group of mobiles to which a message is to be sent, i.e. the mobile group label allocated to that message. The mobile or mobiles then identify that message simply by reference to the mobile group label as attached to data in one or more down transfer slots until the complete message has been received.

In an alternative embodiment of the invention, however, the down-setup phase may be incorporated in a down acknowledgement slot which the base station transmits in response to a message from a mobile so that the mobile is more rapidly setup to receive a message or reply, thereby shortening the response time. Furthermore, where the reply is so long that it is divided into a number of separate part messages, each part message is adapted so as to include the relevant down setup data for the next part message, again avoiding the need for a separate down setup phase and thereby shortening the overall response time.

According to a further feature of the invention, any transmission from a mobile station in response to a message received from the base station may be delayed in time by at least a minimum number of time-slots; and further a transmission from the base station in response to a message received from a mobile may be delayed by at least a minimum number of slots. By this means the radio subsystem of the mobile need not be capable of changing from transmit mode to receive mode very quickly; and the time available for processing signals and protocol messages in the mobile and base station can be maximised.

According to a further feature of the invention, a mobile which does not have data to send during a given period of time, need only activate its receiving and decoding circuits for at least the one down-setup slot in each frame in which the base station announces the transmission of messages for the mobiles, and by this means the power consumed in the mobile may be minimised.

Further reductions in power consumption by a factor of "n" may be obtained by the mobile only activating its receive and decoding circuits for down-setup slot of every "n'th" frame, provided that the base station is aware that this action is being followed and sends transmission announcements for such mobiles only in the appropriate frames.

A further feature of the invention allows the base station to announce changes to the use being made of slots in the up and down frames using the general control slots of the down frame, messages announcing such changes not requiring acknowledgement of successful reception by the mobiles. For example, the number of up-setup slots divided into sub-slots for mobiles to request the setting-up of a data transfer channel, may be varied depending on the degree of load on the system, this change being announced via the general control slots of the down frame. The number of up-setup slots divided into subslots may be varied in accordance with the number of subslots in which collisions between mobile requests take place, and information contained in the request messages themselves as to the number of unsuccessful attempts prior to success.

The use of a slotted ALOHA type system allows the use of low-cost, non-duplex radios.

As with conventional radio based communication systems operating with a slotted ALOHA type system, in order to ensure efficient operation of the system it is important that the base station and the mobile are in alignment with each other. This is achieved using a synchronisation signal which is regularly transmitted by the base station and which allows the mobile to know exactly where it is in a frame.

Preferably, the base station supports radio communication with mobiles on at least one or a multiplicity of duplex information bearers, each comprising a down link and an up link with a frame structure as described earlier, where the overall structure is announced and controlled using the general control slot on one bearer designated a master bearer, all other bearers being slave bearers; and the synchronising information transmitted in the down slots of a master bearer carry information allowing a mobile to rapidly recognise the master bearer, and the synchronising information of slave bearers carry information allowing a mobile to rapidly retune to a master bearer in order to receive information on the overall use being made of down and up slots on all bearers.

DESCRIPTION OF THE DRAWINGS

The invention will now be described by way of example with reference to the accompanying drawings, in which:

FIGS. 2 to 22 show representations of the frames used in the method of transmitting data in accordance with the present invention, in particular, FIG. 2 shows the frame formats, FIG. 3 shows frame related information (down only), FIG. 4 shows the protocol layer 2 structure (up and down), FIG. 5 shows the protocol layer 2 structure (up), FIG. 6 shows details of the upslot timing, FIG. 8 shows slot data encoding, FIG. 10 shows the interleaving process for [1/1] slot, FIG. 11 shows the base/mobile data flows, FIG. 12 shows the radio system implementation model, FIG. 13 shows the down packet set up, FIG. 14 shows the down packet transfer, FIG. 15 shows the protocol layer 3 down link slot contents, FIG. 17 shows the down link packet sementation, FIG. 18 shows the up link packet assembly, FIG. 19 shows the message segmentation, FIG. 20 shows a user/host interaction pattern, FIG. 21 shows the segmentation of an application message in the system of FIGS. 1 to 20, and FIG. 22 shows the segmentation of an application message in an alternative body of the invention.

MODE OF CARRYING OUT THE INVENTION

Figure 1:
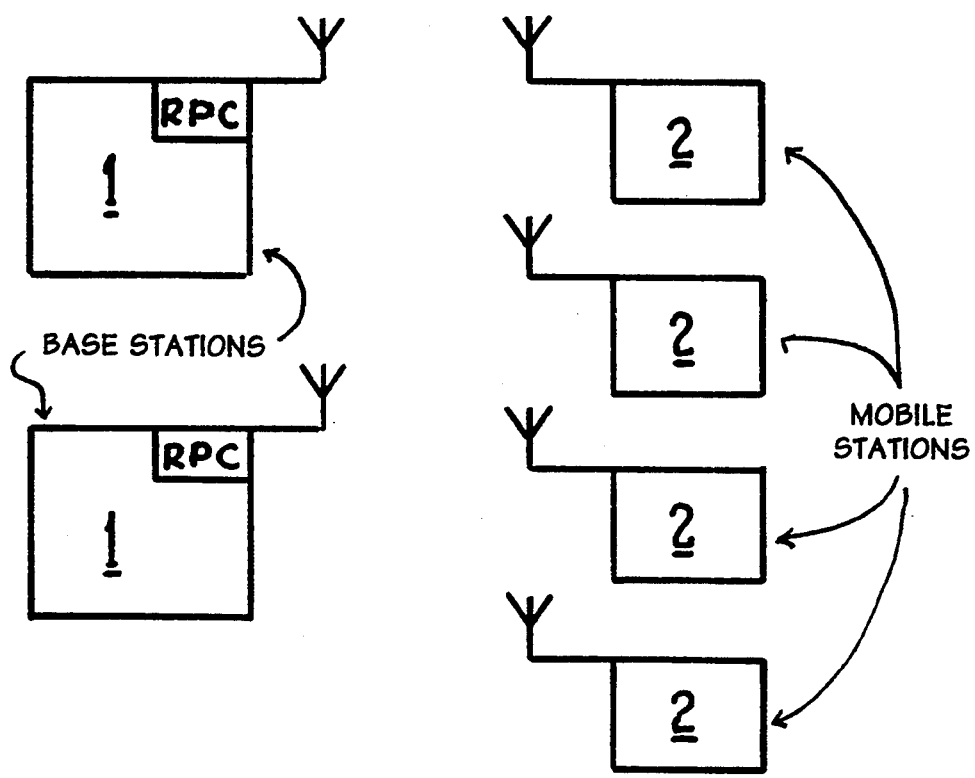
FIG. 1 shows a schematic representation of a communication system for utilising the present invention.

FIG. 1 illustrates a radio based communication system comprising a fixed network of radio base stations or sites 1 and one or more mobile stations 2. Each base station has a radio port controller (RPC) associated with it that predetermines the number of radio frequency bearers that it employs. Communication bearers are formed by pairs of r.f.channels one for transmission of data from the base station 1 to mobile station 2 (downlink) and the other of which is for transmission of data from the mobile station 2 to the base station 1 (uplink). Each channel is therefore simplex.

The communication system operates according to a protocol which is designed using a layered approach. Layer 1 defines the basic radio parameters and is not described in any detail herein. In one embodiment of the system, it permits the transmission of data at a rate of 6144 bits per second. Layer 2 defines a frame and slot structure that allows the bearers to carry time multiplexed data between the base stations and the mobile stations, and also defines a Forward Error Correction (FEC) scheme. Layer 3 defines the allocation of slots into a selection of data channels. Data is sent as a connected series of one or more slots called Transmission Sets (TS) between Radio Multiplexing/Demultiplexing (RMD) means at each end. The RMD means is responsible for any retransmission of lost slots.

Layer 2 is described in the following sections 1.1 to 1.4. Layer 3 is described in terms of a network overview in the following sections 2.1 to 2.10, and in terms of control in the following sections 3.1 to 3.11.

LAYER 2—Data Link Layer 1.1. Frame Format

Figure 2:
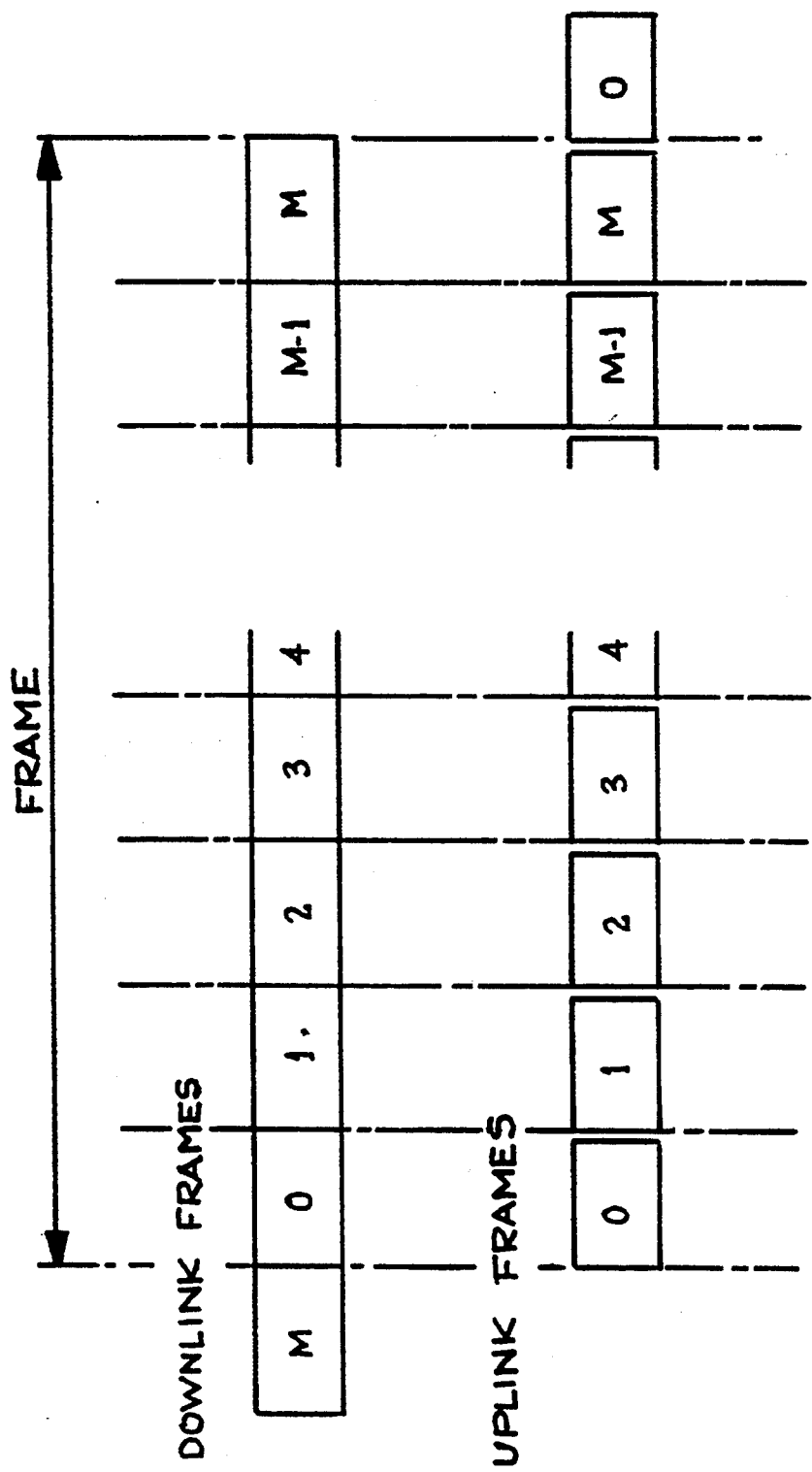

Each of the bearers transmits data in one or more frames which contains data as a series of time multiplexed slots, all of which slots are of the same length, and are grouped into predefined frames, as shown in FIG. 2.

Figure 4:
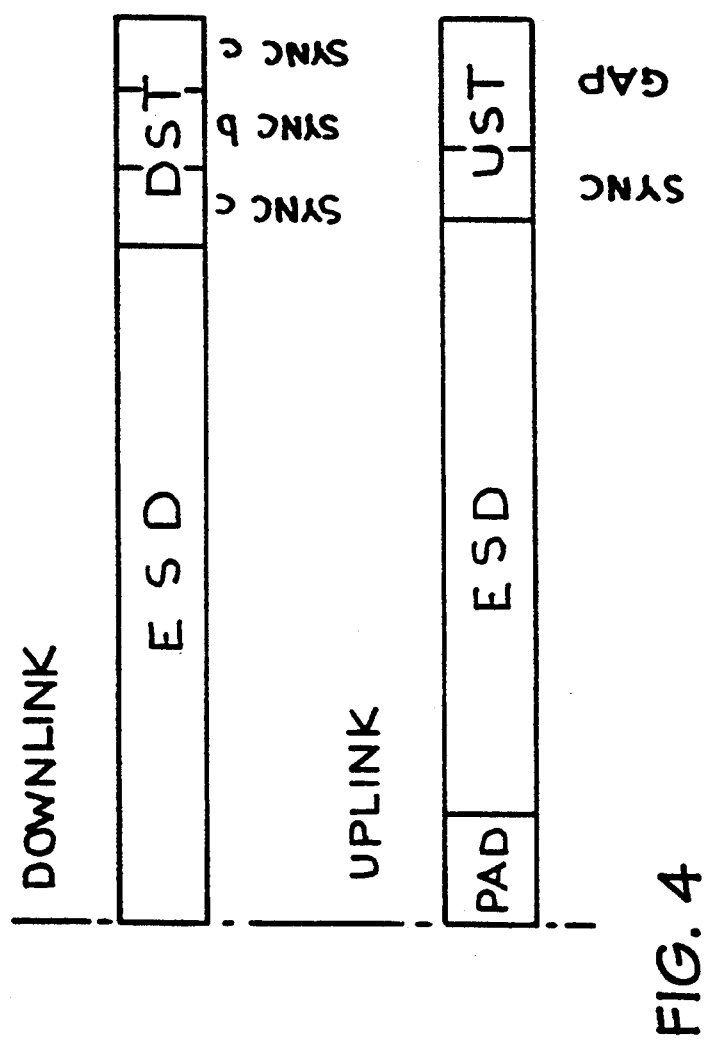

The frame grouping is defined indirectly by the slot trailers, on all downlinks. Each downslot trailer (DST) comprises three bits, sync a, sync b and sync c, as shown in FIG. 4 and provides synchronisation for the individual downslots. A particular sequence of downslot trailers defines the frame. The sequence of downslot trailers also provides specific bearer information detailed below.

Uplinks also contain a series of slots that may be transmitted by different mobiles. Each of these mobiles is required to align its upslot transmission to the downslot timing. A simpler upslot trailer (UST) is used on all upslots comprising a single bit sync and a gap, as shown in FIG. 4. This upslot trailer only provides slot synchronisation, and carries no frame information.

The number of slots in a frame (the frame format) may lie in the following range:

|  | Minimum | Maximum |
| --- | --- | --- |
| Slots/frame | 14 | 26 slots even numbers only |
| Bits/slot | 768 | 768 bits |

All bearers from any one base station or site 1 are required to have the same frame format, with their frames aligned to within 1 bit in order to allow mobile stations 2 to switch between slots on different bearers yet maintain synchronisation.

Frame alignment between different base sites is optional but desirable.

In principle, the protocol allows for different frame formats at different base sites.

FRAME RELATED INFORMATION (DOWNLINK ONLY)

Figure 3:
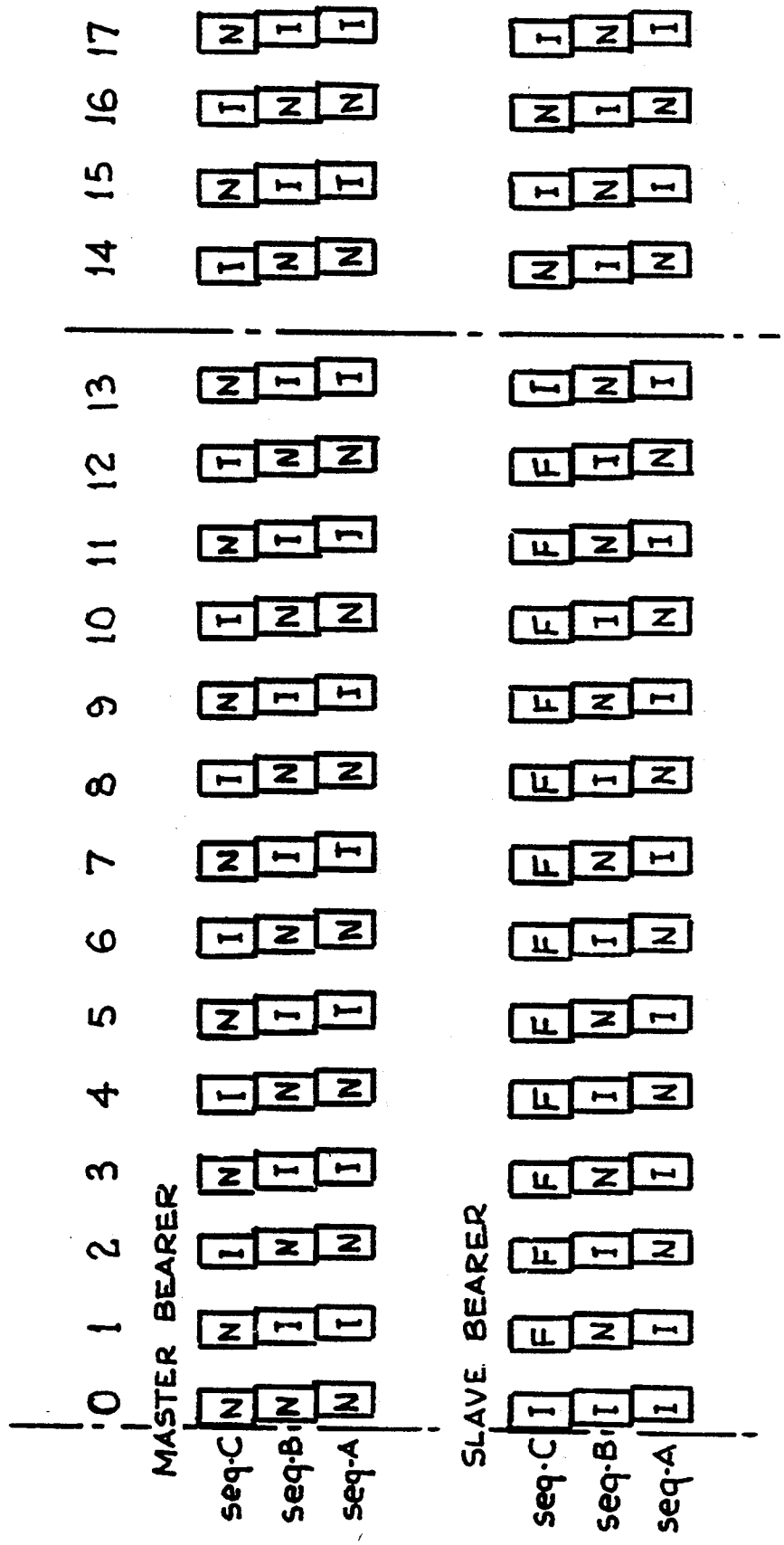

Frame related information is encoded into all the downlink slot trailers (DST) of a frame, as shown in FIG. 3. Each Radio Port Controller (RPC) transmits one master bearer and up to 3 slave bearers. It is important that mobiles can identify slot 0 of the master bearer as quickly as possible, and this is therefore the major component of frame related information. However, the complete frame related information uses all the encoded bits from every slot of a frame. This information contains:

identification of master or slave bearer
identification of slot 0 of a master or slave bearer
a dotting pattern for synchronisation
definition of the frequency offset from a slave to its master.

All the information bits are encoded in the downslot trailers using the synchronisation codewords defined below. Each trailer contains 3 concatenated synchronisation codewords, and each of these codewords encodes one bit of information N=NSYNC as I=ISYNC. The complete frame related information can either be viewed as 3 encoded bits per slot, or as three parallel sequences (seq-A, seq-B, seq-C) that repeat once per frame as shown in FIG. 3. FIG. 3 shows the sequences for the minimum frame format of 14 slots and for 4 extra slots for an extended frame format.

Specifically, the frame related information is defined by the following combinations of the encoded bits. Here, the encoded bits are referred to by their sequence letter:

Master/Slave

Master and slave bearers are clearly distinguished in every slot trailer by the combination of seq-A and seq-B. The encoded bits of seq-A and seq-B in each slot of a master have the same polarity, whereas the encoded bits of seq-A and seq-B in each slot (except slot 0) of a slave have opposite polarity.

Slot 0

The location of Slot 0 can be immediately identified by the combination of seq-A, seq-B and seq-C:

An [NSYNC] in all three encoded bits identifies slot 0 on a master bearer An [ISYNC] in all three encoded bits identifies slot 0 on a slave bearer.

Slot 0 location is used to provide frame synchronisation. It can also be used as a confirmation of the frame length, since the frame length, given by the distance between two successive slots 0's, must equal the predefined value.

Frame Dotting

Frame dotting is introduced to reduce the risk of false frame sync acquisition. Seq-B always contains a dotting sequence:

[ ... ,NSYNC,ISYNC,NSYNC,ISYNC, ... ]

This dotting pattern is a mandatory aspect of successful slot and frame acquisition.

Frequency Offset

The frequency offset differs from the other information, because it requires one encoded bit from several trailers (slot 1 to slot 12 inclusive). These 12 encoded bits are shown as F in seq-C of a slave bearer in FIG. 3. Together these encoded bits define the offset from that slave bearer to the master bearer (of the same RPC) as a 12 bit 2's complement value. The most significant bit is at slot 1, the least significant at slot 12.

1.2 Slot Formats

Figure 5:
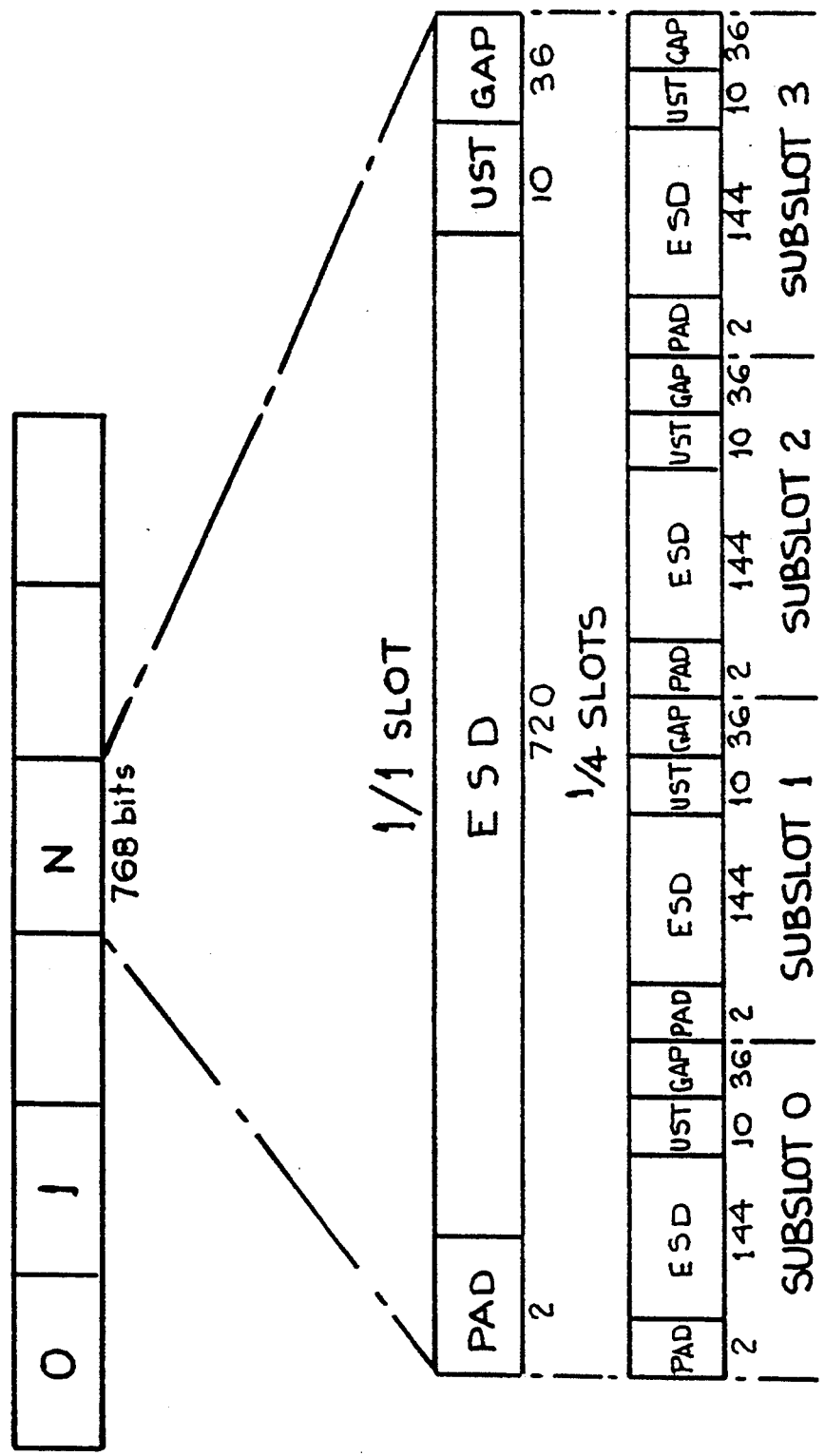

The full slot length is designed for optimum segmentation of user messages up to 256 octets long. The protocol also provides an option of subdividing one or more upslots into [1/4] subslots, as shown in FIG. 5. These subslots are used on the uplink only to allow for very short contention subslots.

The slots and subslots supply the following range of data capacity to layer 3 of the protocol:

[1/1] slot 510 bits (10 forward error correction FEC blocks of 51 bits) of layer 3 data

[1/4] slot 102 bits (2 forward error correction FEC blocks of 51 bits) of layer 3 data.

Slot Summary

The slot formats are designed to use an exact number of forward error correction (FEC) blocks in all the slot formats. The contents of each slot are defined in the following components as shown in FIGS. 4 and 5:

| DOWNLINK | UPLINK |
| --- | --- |
| Encoded slot data (ESD) | Padding |
| Down slot trailer | Encoded slot data (ESD) |
|  | Up slot trailer |
|  | Up slot Gap |

Padding

A minimum of 2 bits of padding is provided on all uplink slots, to provide initialisation for the differential decoding if required. No padding is added to downslots, since a mobile receiver can initialise its decoding on the trailer of the previous slot. Padding is placed at the start of each upslot or upsubslot, and the padding bits are filled with a dotting pattern. The dotting pattern used is:

[01] on upslots

Transmission of this padding is mandatory. The protocol also allows for optional transmission of further padding by mobiles.

Optional Uplink Padding

Mobiles are permitted to transmit additional padding bits at three points:

during the carrier attack time.
during the carrier release time.
in the gap between slots, when the mobile is transmitting successive slots.

If transmitted, this dotting must be fully synchronous to the encoded slot data. Optional padding can only be added in steps of 2 bits (i.e. an odd number of padding bits is not allowed).

No other data pattern is allowed if this optional dotting is not transmitted.

Down Slot Trailer

A down slot trailer is transmitted at each slot position. The down slot trailer DST uses three synchronisation codewords that together provide a synchronisation sequence. Each 16 bit codeword can be used normal or inverted, to encode 1 bit of information. Each codeword is used to encode one bit of one of the frame sequences as follows:

Codeword 2:1=NSYNC:0=ISYNC:(one bit of seq-C)

Codeword 1:1=NSYNC:0=ISYNC:(one bit of seq-B)

Codeword 0:1=NSYNC:0=ISYNC:(one bit of seq-A)

The encoding uses the following complementary sync words:

NSYNC (Normal sync): [1100 0100 1101 0111]
ISYNC (Inverted sync): [0011 1011 0010 1000]

All mobile receivers are expected to be able to ocate slots to an accuracy of +/−10 bits by simple timing from a previous slot where frame sync had been acquired.

Up Slot Trailer

An up slot trailer UST is also required at each slot and subslot position. This contains the single up slot synchronisation codeword:

Codeword 0:USYNC

USYNC (Up sync): [0011 1001 01]

All mobiles are assumed to be able to transmit slots to an accuracy of +/−1 bit by timing (using the down slot trailer to provide slot and frame sync). The up slot trailer UST is designed to provide synchronisation to cover three sources of error:

the mobile timing error of +/−1 bit (just described)
a base timing error of +/−1 bit
0 to 2 bits of propagation delay This gives a total of 6 bits of timing and propagation errors. The overall synchronisation requirement is therefore +/−3 bits.

Up Slot Gap

The up slot gap is used to allow for time division multiplexing and timing errors on the uplink. This gap allows for the following elements:

30 bits to provide carrier attack/release time (of approximately 5 msec at 6.144 kbps)
6 bits to allow for timing and propagation errors.

Figure 6:
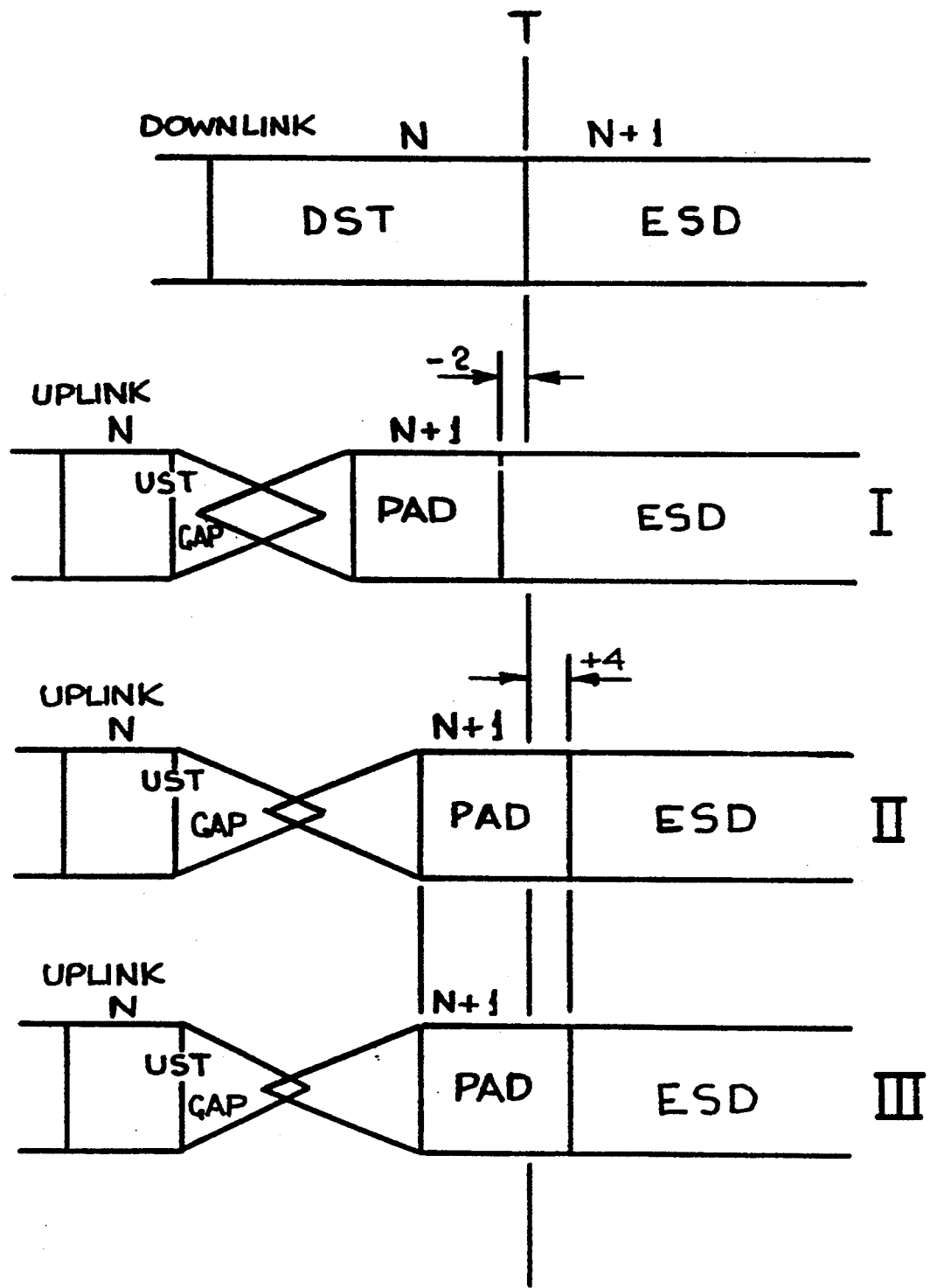

The timing diagram for upslots (relative to downslots) is shown in FIG. 6. The timing shown is all referred to the base antenna, but the timing referenced to each mobile antenna will differ depending on its distance from the base (i.e. the propagation delay).

All mobiles behave as though their antenna is adjacent to the base antenna, and transmit relative to their individual received timing, ignoring the possibility that this can be delayed by up to 1 bit for distant mobiles. Thus each mobile should attempt to align the leading edge of its [1/1] transmission with the leading edge of the base transmission. The latest reply then contains a double propagation delay of 2 bits (plus any timing errors) when viewed at the base antenna.

All timing is referenced to the leading edge of the first (most significant) bit of each [1/1] downslot, shown as T between slot N and slot N+1 in FIG. 6. FIG. 6 shows three extreme timing examples with the carrier attack and release envelopes shown by the overlapping triangle symbols:

I—The earliest mobile arrival occurs at [−2] bits as a result of a timing error of [−2] bits.
II—The latest mobile arrival occurs at [+4] bits as a result of a propagation delay of [+2] bits plus a timing error of [+2] bits.
III—Any mobile can transmit additional padding, and the third example shows the maximum padding on a latest arrival mobile transmission.

Encoded Slot Data

Encoded slot data is an encoded form of the data supplied to/from the layer 3 protocols.

Differential Coding Implementation

Figure 7A:
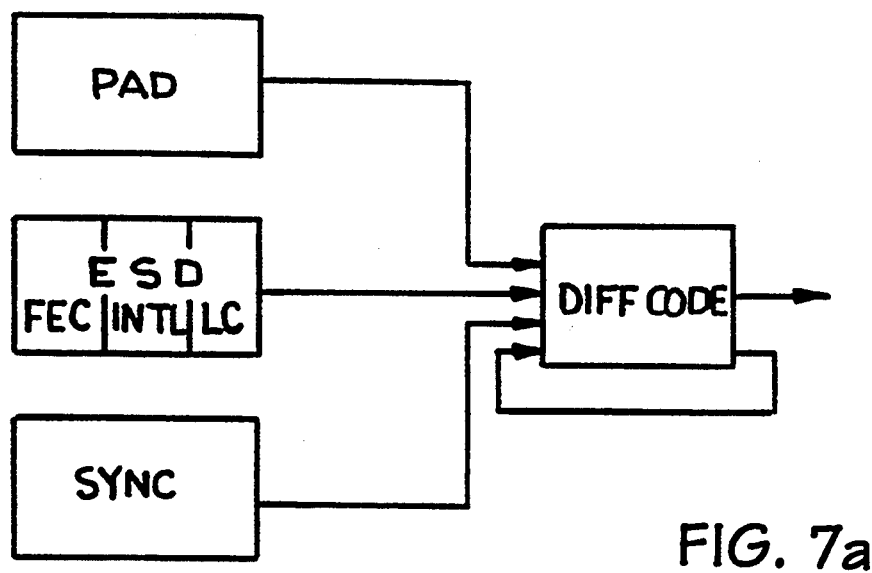
FIGS. 7a and 7b show arrangements of differential encoding.
Figure 7B:
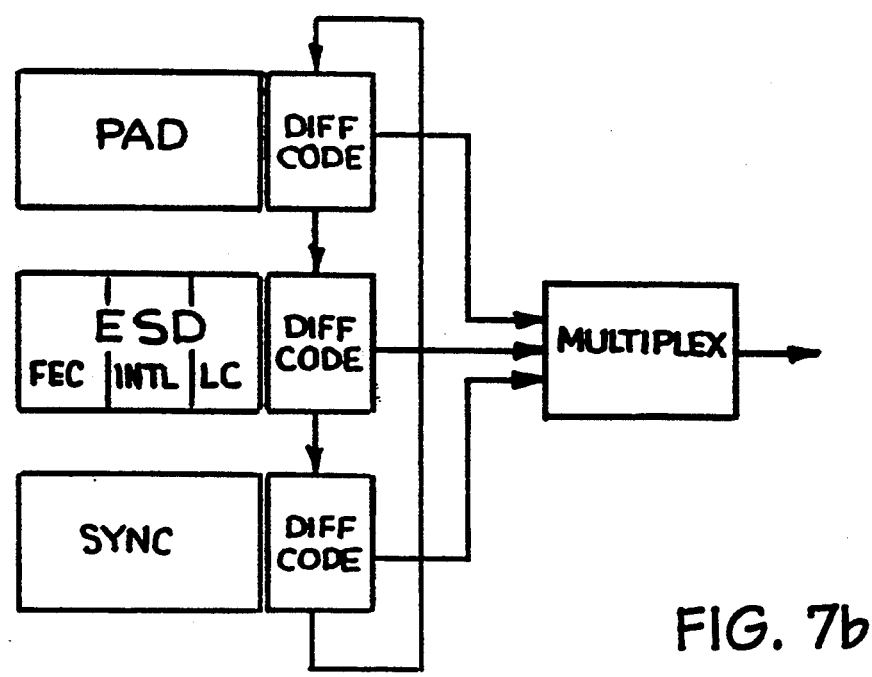

Although the protocol defines differential coding as a layer 1 process, it may be preferable to consider implementation that combine the layer 2 processes with differential encoding. This is suggested for ease of implementation of the line coding (i.e. the final stage of slot data encoding). The principle is shown in FIGS. 7a and 7b. FIG. 7a shows the strict layered approach; FIG. 7b shows an alternative arrangement with separate differential encoding DIFF CODE for each layer 2 element. Note that in both cases the differential coding must maintain knowledge of the most recent previous transmitted bit.

1.3 Slot Data Encoding

Figure 8:
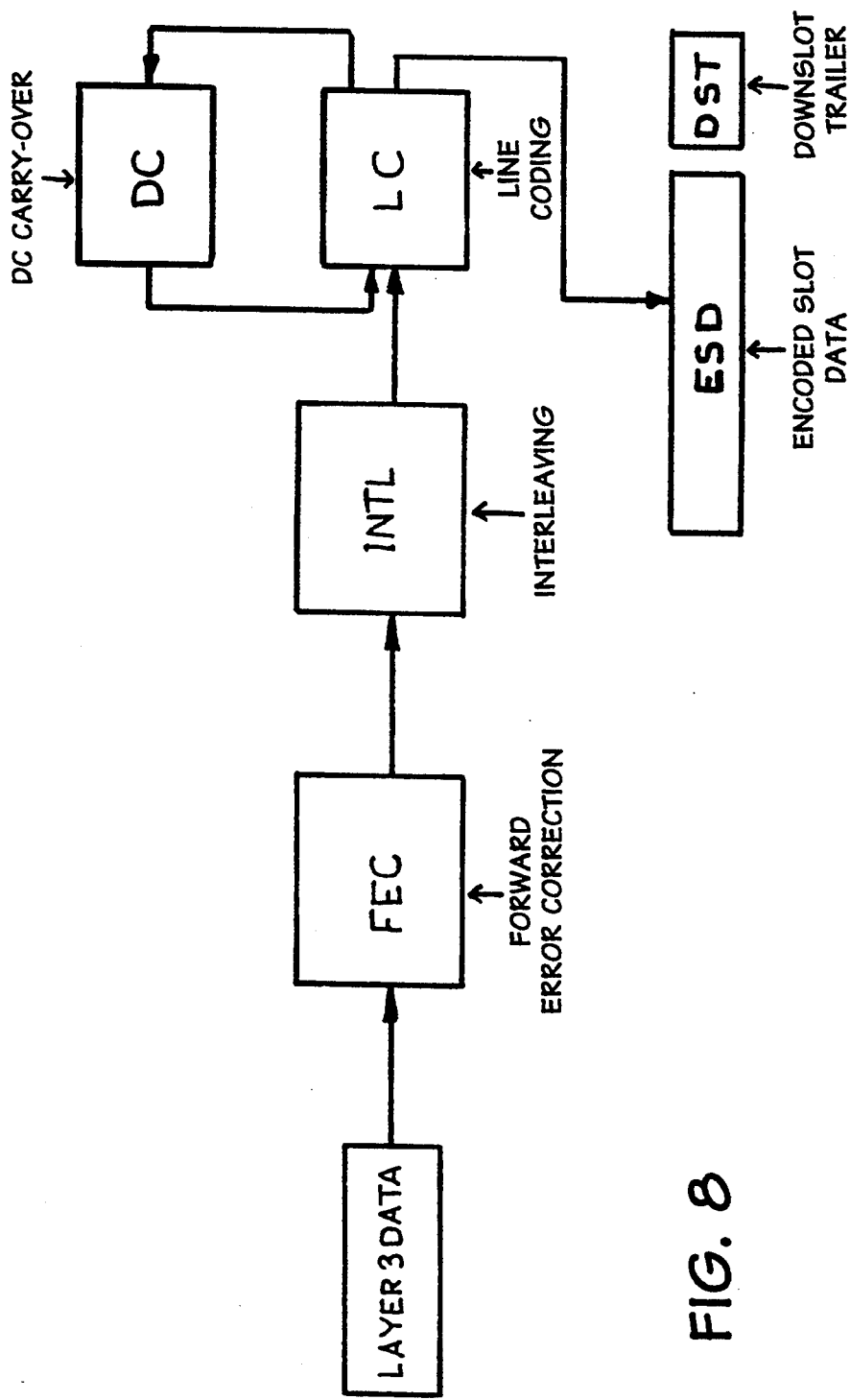
Figure 9A:
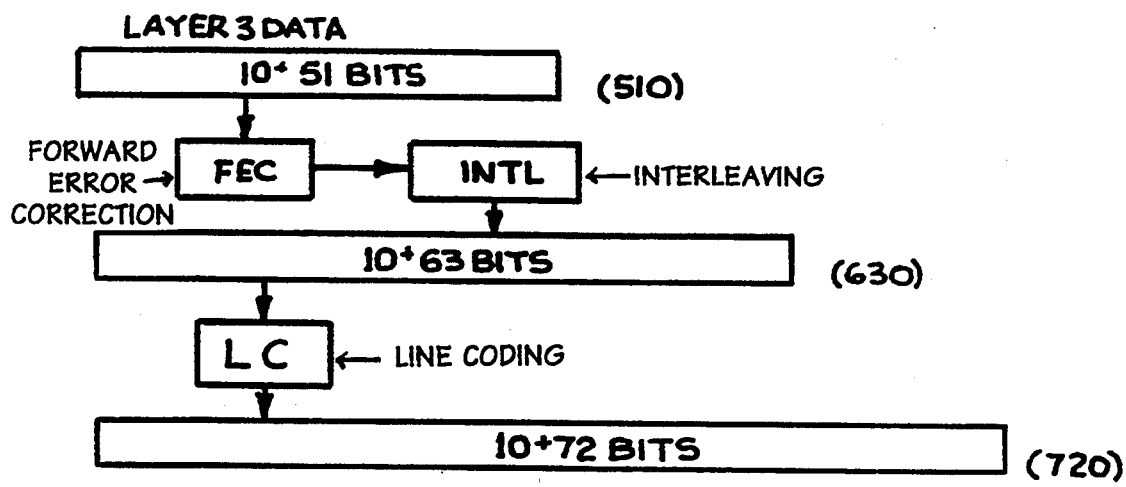
FIGS. 9a and 9b show the encoding of [1/1] and [1/4] slots.
Figure 9B:
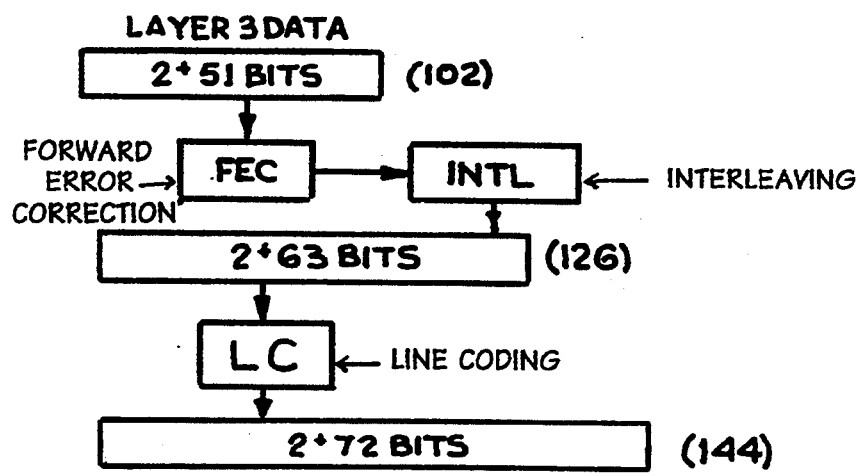

Three encoding processes are applied to the layer 3 data:

Forward Error Correction FEC
Interleaving—INTL
Line Coding (with DC carry-over DC)—LC The processes are applied as shown in FIG. 8. Each encoding process adds to the layer 3 data, as shown in FIG. 9a for [1/1] slots and as shown in FIG. 9b for [1/4] slots.

Forward Error Correction (FEC)

Forward error correction uses the BCH(63,51) block code for all slots and subslots.

As the FEC encoding is a block structured process, the slot size has been arranged to contain an integral number of FEC blocks:

| Slot type | Number of FEC blocks |
| --- | --- |
| [1/1] | 10 |
| [1/4] | 2 |

The FEC code is used to protect the complete layer 3 data (it does not protect the slot trailer or the padding). The FEC is only used for error correction, and not for error detection.

The FEC code has the following characteristics:

| | |
| --- | --- |
| Code rate: | 0.81 |
| Maximum error correction: | 2 errors per block |
| Encoded block size: | 63 bits |
| Information content: | 51 bits per block |

Interleaving

Figure 10:
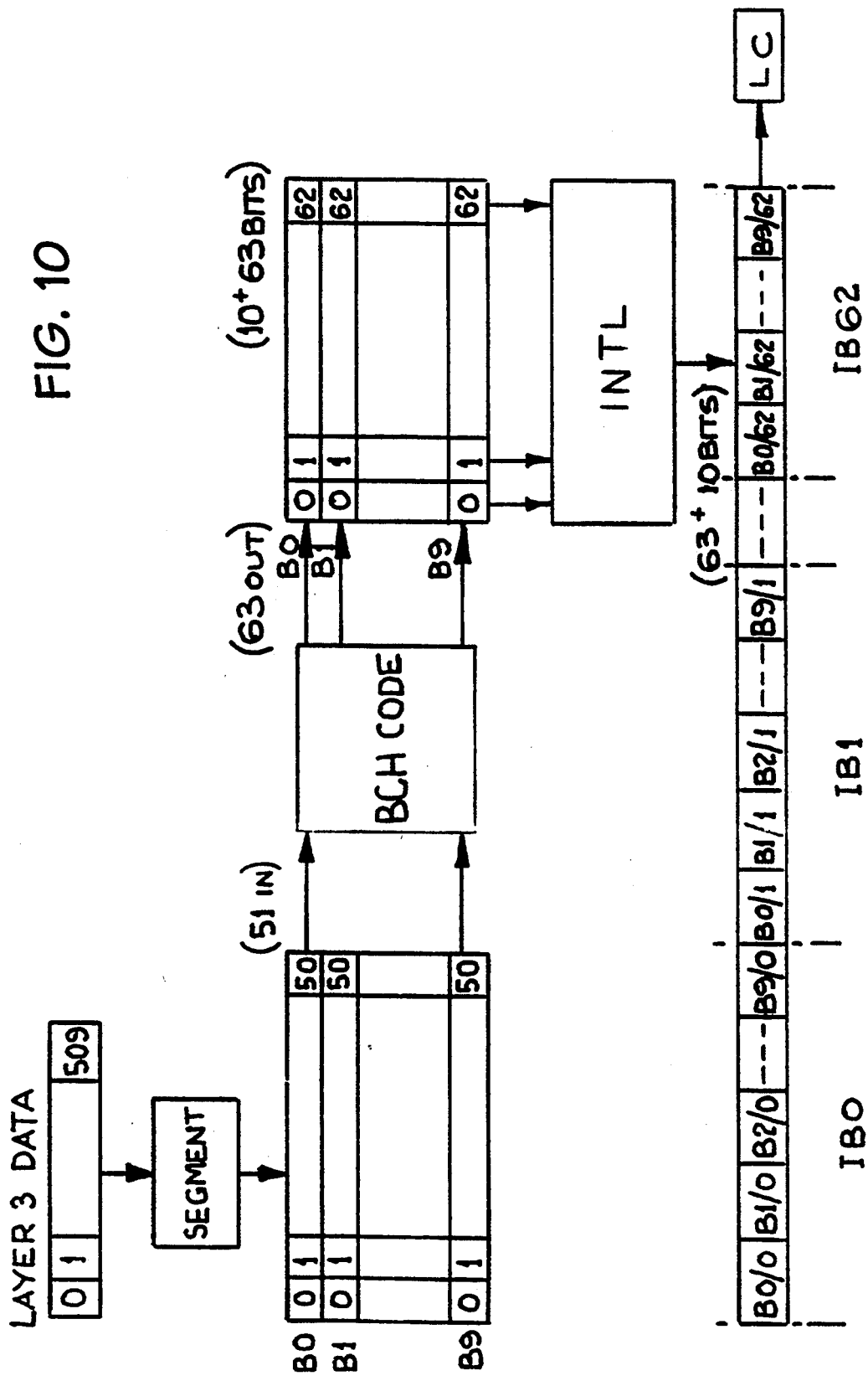

The FEC blocks will be fully interleaved over the complete slot, for each slot or subslot as shown in FIG. 10. All the FEC blocks (for each slot or subslot) are interleaved on a bit-by-bit basis, starting with the most significant bit of the first block B0, and finishing with the least significant bit of the last block B9 to produce interleaved blocks IB0 to IB62. This improves the burst error correction properties, by distributing burst errors across several FEC blocks.

Line Coding

Line coding is used to meet the modulation contraints of simple radios, by maintaining a zero DC content and a low Digital Sum Variation (DSV). This allows the radio modulator to operate with no DC capability and a limited low frequency capability. A 7:8 block code is used that encodes 7 bits of input into 8 bits of balanced output, and this operates directly on the interleaved data. The FEC plus interleaving always yields an exact number of line code blocks.

The line coding is required to maintain a zero DC content in the differentially encoded data stream. This requires the line coder to use a 'history' bit that monitors the differentially encoded output.

DC Carry Over

The line coding can leave a residual DC imbalance at the end of each codeword. This imbalance is carried over from codeword to codeword so that the imbalance is always limited to either +4, +2, 0, −2 or −4 bits at the end of every codeword. This imbalance must be maintained for all downlink transmissions and for any sequential uplink transmissions. It should only be set to zero at the start of a transmission.

For the continuous downlink transmissions the imbalance at the end of the ESD of a slot (or subslot) is carried over to the start of the ESD of the next slot (or subslot), where it provides the initialisation condition for the line coding. This is designed to maintain the DC content in the binary data close to zero under all conditions.

The base therefore only initialises the line coder with a zero imbalance at (power-up) initialisation. Subsequently the base will always carry over the residual imbalance from slot to slot.

The mobile will initialise every new transmission with a zero imbalance, and is only required to carry over the imbalance when transmitting adjacent sequential [1/1] slots.

1.4 Order of Transmission

The general rule for order of transmission is most significant first. Specifically, data is transmitted in the following order:

i Bits for each octet are transmitted most significant first. This means bit 7 first, bit 0 last.
ii Octets are transmitted most significant first.
iii A slot is transmitted:
   First—optional padding (uplink only)
   Second—padding
   Third—encoded slot data
   Fourth—slot trailer
iv Padding is transmitted most significant bit first.
v Trailers are transmitted most significant codeword first. Each codeword is transmitted most significant bit first. Bit 0 is always the least significant.
vi Slot data is transmitted most significant first.

A network overview with regard to the layer 3 protocols will now be given.

2. LAYER 3—Network Overview

2.1 Data Transfer Requirements: Logical Model

Figure 11:
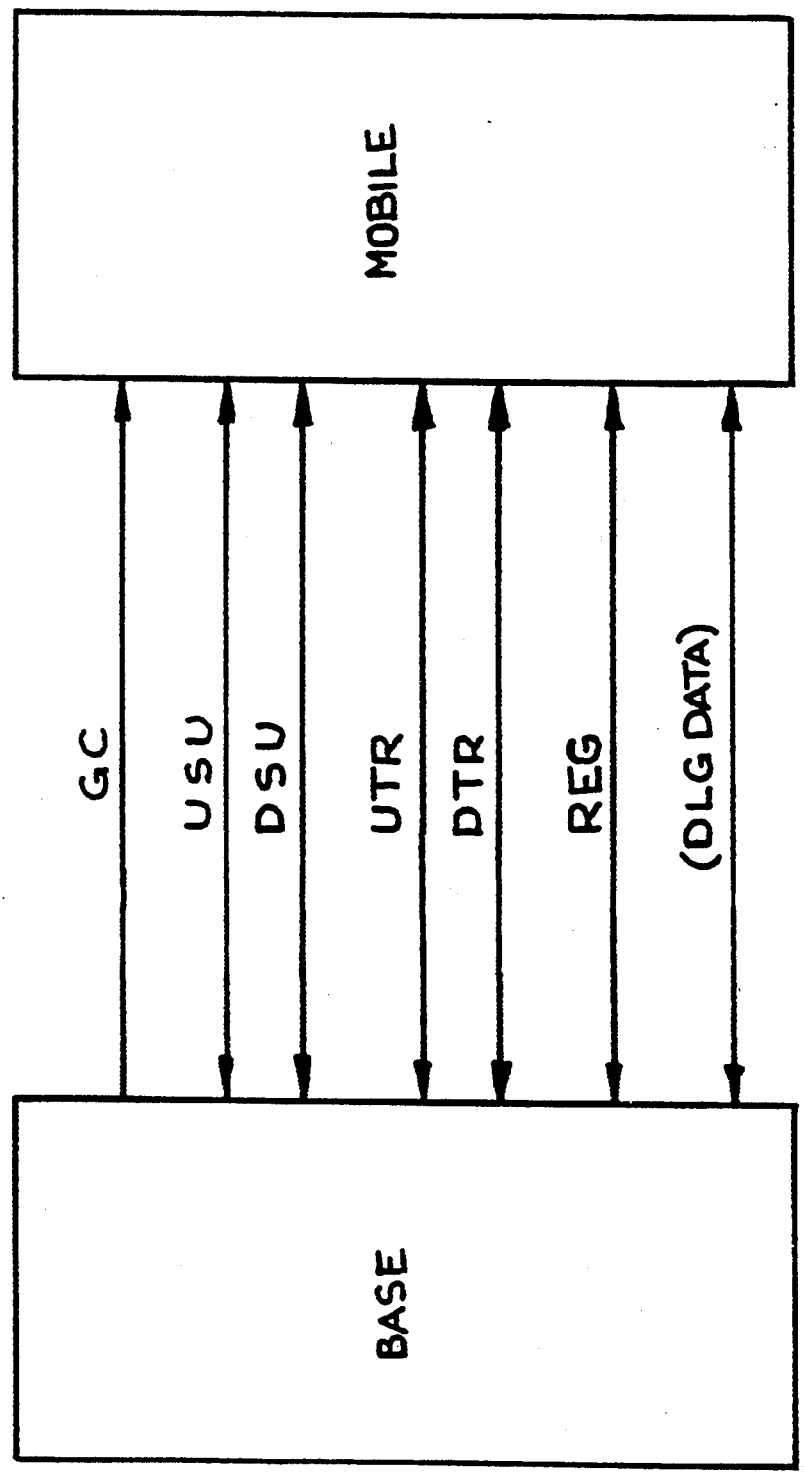

The Layer 3 protocols are designed to transmit data items in a reliable manner between the base and mobile. The data items have different characteristics, and are grouped into a set of data channels, as shown in FIG. 11. The following data channels are defined:

| DATA CHANNEL | DOWNLINK Mode | DOWNLINK Data | UPLINK Mode | UPLINK Data |
|---|---|---|---|---|
| General Control (GC) | R | Control | | NONE |
| Up-setup (USU) | R | AC-K/Ctrl | C | Request |
| Down-setup (DSU) | R | Announce | R | ACK |
| Up-Packet transfer (UTR) | R | ACK/Ctrl | R | Message |
| Down-Packet transfer (DTR) | R | Message | R | ACK |
| Registration (REG) | R | ACK/Ctrl | C | Request |

R = Reserved slot(s); C = Contention subslot(s)

All data channels are bi-directional, except General Control. However, any bi-directional data channel can be used unidirectionally; for example down-setup can contain general control data, which is unacknowledged.

The General Control Channels is unidirectional. The data will generally be broadcast, i.e. more than one mobile needs to receive it. It contains essentially fixed data about the particular base, e.g. transmission frequencies and slot maps. Once a mobile has received the GC data, it no longer needs to monitor it as there is no new information. It will be directed to monitor a setup data channel (specified by the GC data) such that it can receive messages. However, the GC data must be continuously transmitted so that newly registering mobiles can learn the base configuration.

The up-setup channel USU is bi-directional. An up-setup request is sent from a mobile to the base when the mobile wants to send an up-packet. These requests are unidirectional from mobile to base. When the RPC accepts the up-setup request, an acknowledgement message is sent back to the mobile.

The down-setup channel DSU is bi-directional. A down-setup announcement is broadcast to a particular group of mobiles to tell them to collect a message which has become available for them. It is bi-directional because one mobile is always expected to send a positive acknowledgement that the setup has been correctly received.

Changes in the GC data can be transmitted to mobiles as part of the down-setup information. It is also possible for the base to effectively stop sending setup data (for example, by switching transmissions to a non-existent group) in which case the mobiles will time out and automatically revert to the GC data channel.

Up-packet and Down-packet transfer data channels UTR, DTR are bi-directional. These data channels contain the bulk of the message information from users. The message data is unidirectional, and it is always positively acknowledged by the receiver. A single user message may need to be segmented into several slots. For down-packet the minimum is a single (repeated) acknowledge for the whole message.

The registration channel REG is bi-directional. A registration request is sent from a mobile to the base when the mobile wants to make its presence known to the system. Requests are unidirectional from mobile to base. When the RPC accepts the registration request, an acknowledgement message is sent back to the mobile.

2.2 Data Transfer: Physical Model

The logical model, which contains several data channels, must be implemented physically via a radio link, using the time multiplexed frame and slot structure described earlier.

The characteristics of the radio link are:
time multiplexed data on all bearers.
broadcast mode from base to mobile: all mobiles (within range) are assumed to be able to receive all transmissions from a base.
broadcast mode from mobile to base: more than one base may receive a transmission from a mobile. (In the extreme case a distant mobile may prevent a local mobile from communicating with its local base: this is co-channel interference).
mobiles are unaware of each other's presence, and can transmit simultaneously on some data channels, with a risk that they will interfere with each other's transmissions.

The radio link is organised in a particular way to accommodate these characteristics. Each base station transmits and receives on a small, fixed number of bearers. Each bearer defines a fixed frequency base transmit link (downlink) and a fixed frequency base receive link (uplink). Low traffic base stations use one bearer (i.e. one uplink and one downlink). Higher traffic base stations can use up to a maximum of four bearers. All link frequencies are fixed.

The usage of each link is defined by the base. It decides that particular slots will be used to implement one of the data channel types defined above. Slots may be used individually, or be grouped to serve the needs of a particular data channel. The exact configuration may be changed to suit different traffic patterns, and this may be done adaptively while the system is operating. However, for an initial understanding of system operation, it can be assumed that the configuration is constant from frame to frame.

A particular characteristic of the radio uplinks referred to above is that mobiles can sometimes transmit simultaneously, interfering with each others, transmissions. The protocols handle this by minimising the number and length of unsolicited transmissions from mobiles. A small set of slots are specifically allocated for this contention traffic, and a set of contention handling protocols resolve simultaneous transmissions which become corrupted. These contention slots are used for the unsolicited transmissions from a mobile, specifically registration and up-setup.

Outside these contention slots, the mobiles may only transmit in reserved slots. The base station reserves slots for individual mobiles, and tells each mobile when to transmit, so that contention should not occur for any traffic which the base knows about in advance.

The implementation model comprises a Radio Multiplexer/Demultiplexer RMD in both the base and mobile which multiplexes the various data channels over the radio bearers. The base RMD is the master, and transmits a continuous sequence of frames containing the slot structure. The mobile synchronises to this transmitted data, using a synchronisation pattern it detects in the Downslot Trailer as described above.

The RMD uses the slot map to look up which format of slot it is to transmit at each slot output time. The slot map is simply a list of slot numbers against a slot format. After looking up the format, the RMD fetches data to fill each slot from the appropriate input logical channel. For example, if the next slot is a setup format slot, the RMD will fetch data from the setup data channel output queue.

At the mobile, the RMD needs to know slot formats for the slots it needs to receive and transmit and so uses a slot map in the same way as the base. Obviously the slot map at base and mobile must be identical in order for data to be transferred correctly but the slot map cannot be permanently programmed in to the mobile for reasons of flexibility and adaption as explained above. The solution is for the mobile slot map to be transmitted—as needed—over the General Control GC and setup data channels.

System initialisation and reconfiguration are explained below. Briefly, the slot map in the base will be initialised to some predetermined slot assignment IM which will meet some assumed standard mix of traffic types. The slot map in the mobile will be initialised to expect a General Control channel on slot 0 of the Master Bearer. This General Control channel position is the only mandatory requirement of the configuration.

Figure 12:
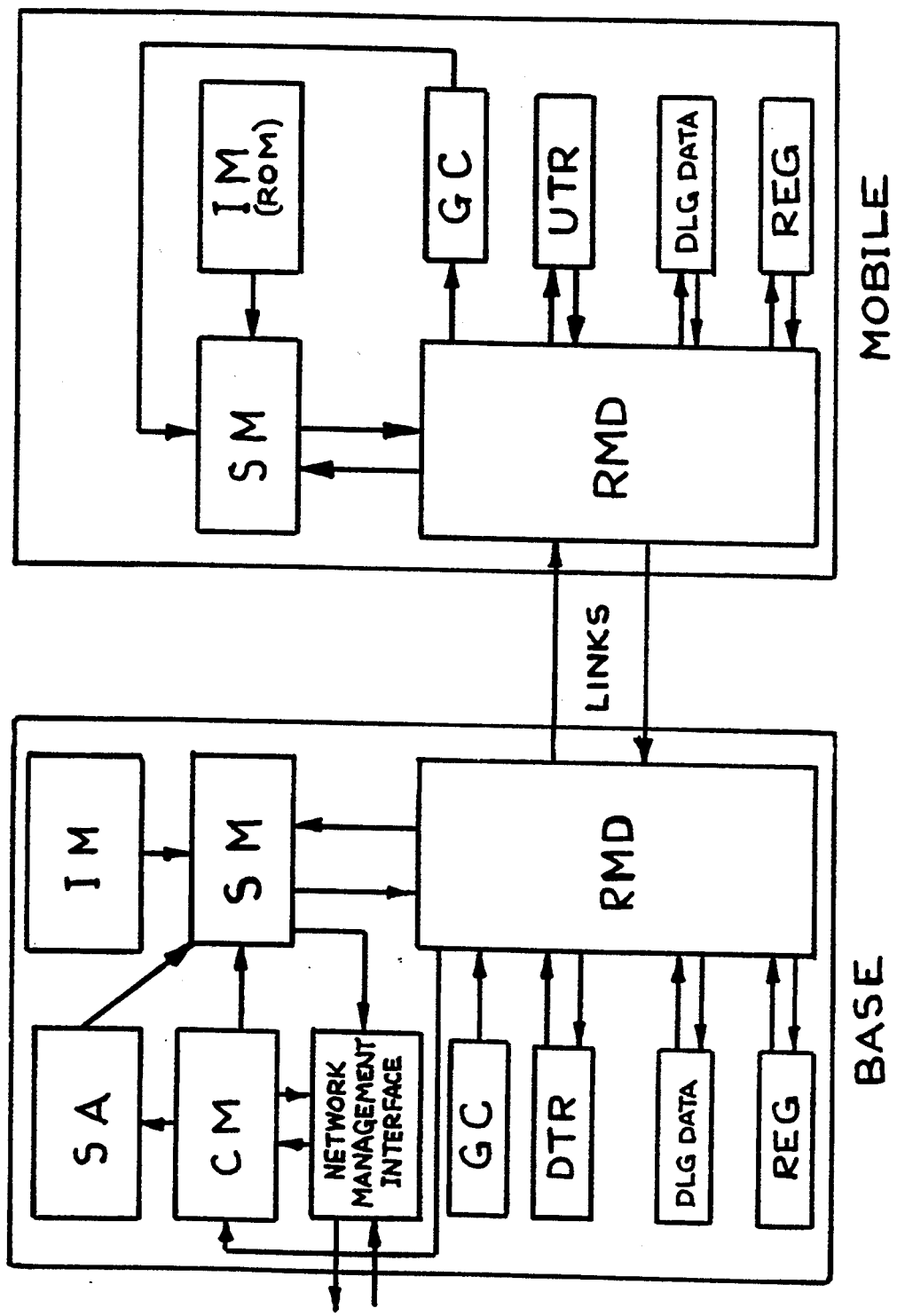

The slot map SM can be adjusted during operation by the Slot Allocator SA, as shown in FIG. 12. This is driven by a Capacity Manager algorithm CM which uses data provided by the Radio Multiplexer/Demultiplexer RMD to indicate current traffic characteristics. It is anticipated that the adjustment of the slot map is a relatively long term process, compared with the slot transmission rate.

2.3 System Operation: Down Packet Transfer

Figure 13:
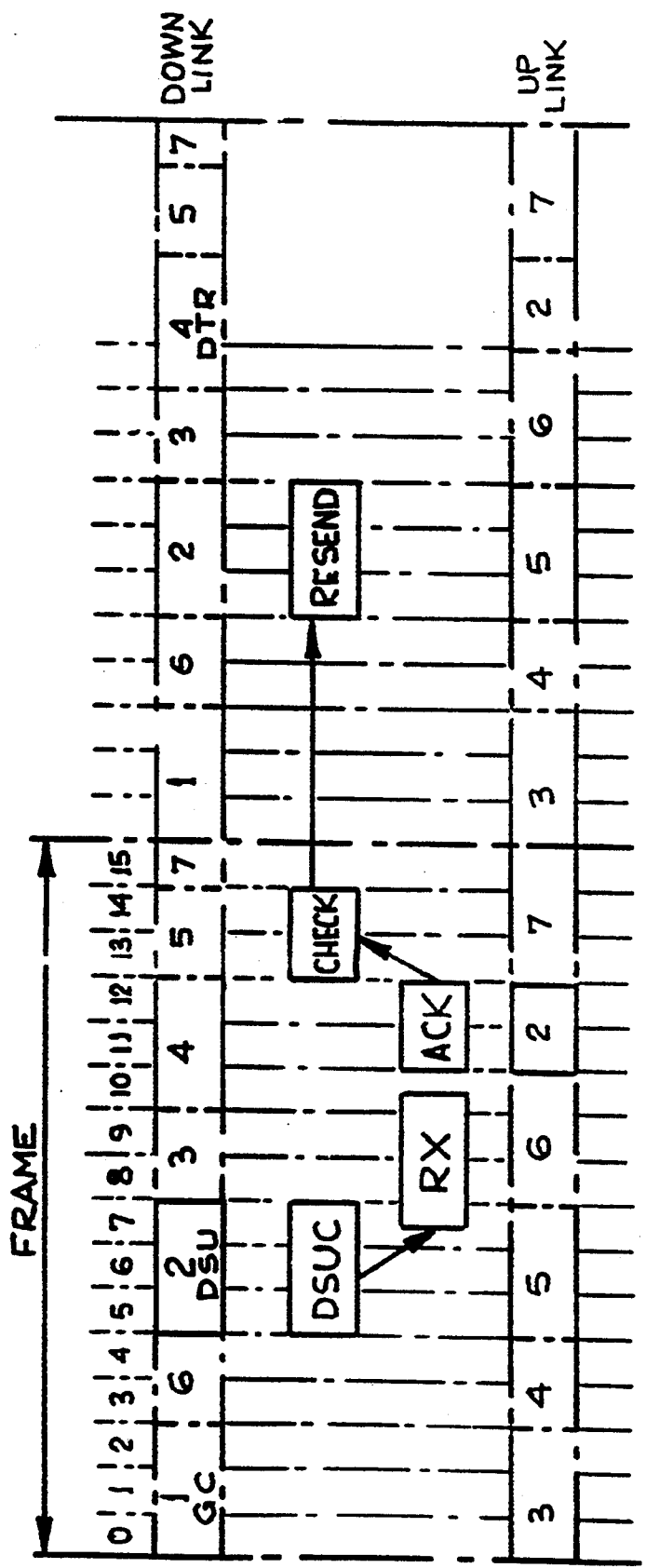

An example of system operation is given for the case of packet transmission from base to mobile. The transmission takes place in two phases, down setup and down transfer. For this example, assume that all initialisation and registration is complete. In this case, the mobile will be monitoring transmissions on a down-setup channel. It will have been directed to this setup channel by previous general control data, and it is expected to remain on the setup channel until it is directed elsewhere by data transferred over the setup channel. A summary of a possible initial system state is:

single bearer RPC with slot allocation, as shown in FIG. 13, mobile monitoring down-setup channel 2 (slot 6).

The downlink part of a down-setup channel uses a slot format of type [1/1]. As there is a large population of mobiles all potentially available to receive messages at any time, there will be a set of many mobiles monitoring this same slot.

In order to transmit a packet to a mobile, the base broadcasts a setup command DSUC in this setup channel, as shown in FIG. 13. Each setup command contains the mobile-ID and information on where (which bearer and slot) the rest of the message will be transmitted. It also specifies an identifying label for the forthcoming message, the Mobile Group Label, or MGL.

Each down-setup slot can contain several setup commands. For each down-setup command, only one mobile will correctly receive and decode its own mobile ID. This mobile is then expected to transmit an acknowledgement ACK of the setup message to the base, then return its receiver to the specified channel, receive the specified slot(s), and extract its message. At this stage the mobile will be receiving data from a down packet transfer channel DTR, i.e. data channel 4 (slot 11).

Figure 14:
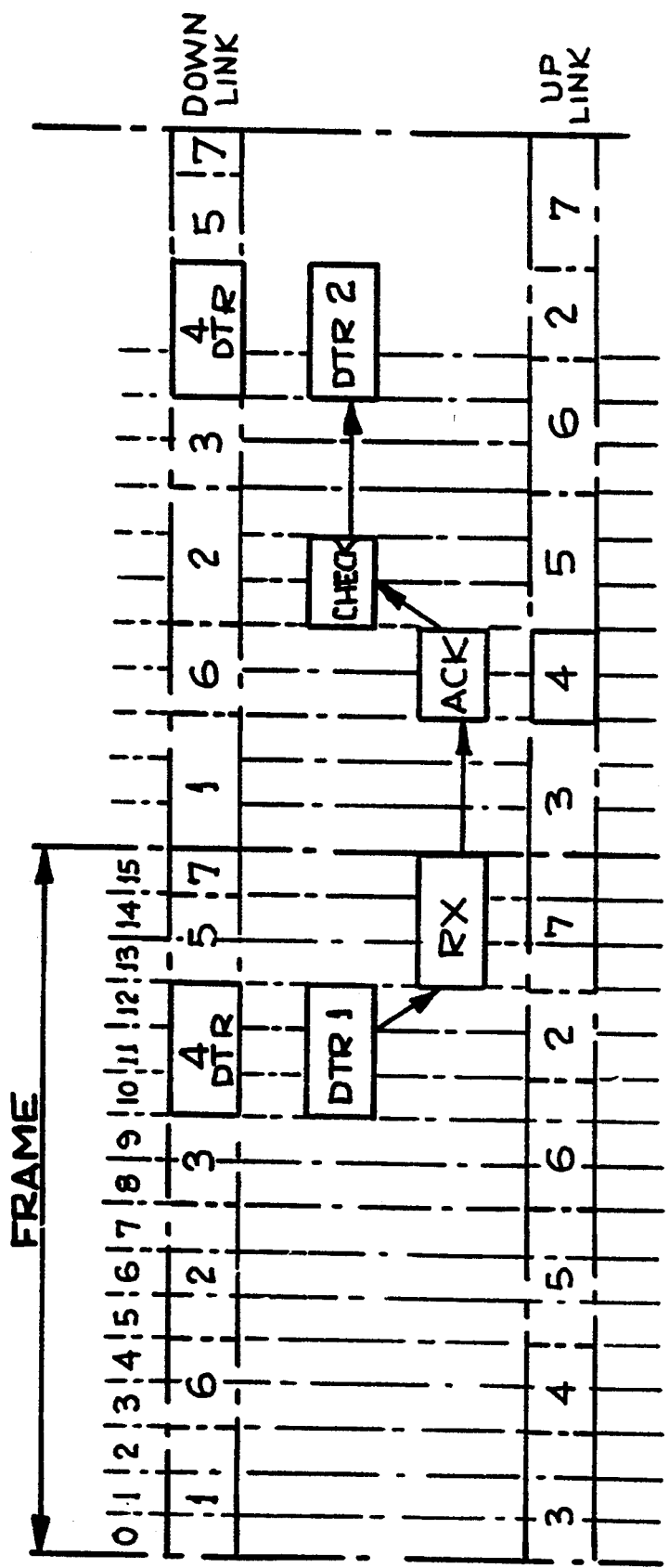

In the down packet transfer phase, as shown in FIG. 14, a set of mobiles will be monitoring this packet transfer channel DTR at any one time: this set is the set of mobiles with packet transfers in progress. The mobile decodes all data in this packet transfer data channel and ignores everything except that preceded by the specified MGL. It may have to receive several slots from this packet transfer channel until it receives its expected message DTR1, DTR2. Note that the message is only identified by the specified MGL; the mobile ID only appears in the setup.

As each slot is received, the data is decoded and the complete packet is assembled. An index number is transmitted as part of the fixed overhead, so that the receiver can check that all components of the packet have been received. As each slot DTR1, DTR2 is received and decoded correctly, the mobile will transmit an ACK for the slot in a reserved subslot (as specified by the set up).

In addition to the user data transmitted over the packet transfer channel, more control data can be transmitted (in the form of fixed overheads and control blocks), which can be used to give additional information on how the mobile should proceed.

The end of the packet is defined by the mobile correctly receiving the expected number of packet slots. The mobile will then automatically revert to monitoring the original set up channel DSU.

2.4 Terminology

The protocol specification uses certain terms in a precise way to define system operation. A brief definition of the most important terms is given in this section.

Data channel

Refers to the path between mobile and base over which data of a particular type is transferred.

Phase

The protocol exists as a sequence of phases, e.g.
down-setup
packet transfer

The protocols move from phase to phase as a result of data which is transmitted and external events which occur (e.g. a user deciding to register). The protocols are in a phase if data of that type is being transmitted at any time.

Transmission Set (TS)

The TS is a set of transmissions over a data channel which constitutes a complete unit of data. For example, a packet transfer transmission set consists of the individual slot transmissions into which the overall packet is segmented, and includes the ACKs.

Transmission Set Index (TSI)

An index number which identifies the individual slot transmissions comprising the total transmission set. For a TS which extends over 4 slots, the TSI runs from 1 to 4. The index numbers are re-used and are therefore not unique across different transmission sets.

Mobile Group

The base may choose to communicate with one mobile, or a set of mobiles. This set (including the case of one mobile only) is called a Mobile Group.

Mobile Group Label (MGL)

An identifying number which uniquely associates a TS with a mobile group. The association can be temporary, and a number may be re-used later for a different TS or Mobile Group. There is only one MGL which applies to each transmission set. It is unique across a base site (and not just RPC).

State

Used in conventional sense; it completely defines the operating condition for the base or mobile at any instant. State transitions occur as a result of internal or external events. Some events may be protocol related (e.g. registration), others may be hardware rather than protocol related (e.g. low battery in mobile).

States are unique, in the sense that mobile and base will be in one and only one state at any time. Phases are not unique, in the sense that the protocols allow (e.g.) packet down-setup and registration to occur simultaneously.

Slot Map

A table which completely defines the current slot format and usage for all slots and all bearers at any point in time. It is RPC specific.

Link

The radio connection uses radio links. One uplink and one downlink is provided by each bearer. 'Link' is preferred to 'radio channel' to avoid confusion with 'data channel'.

2.5 System Initialisation
RPC Initialisation

The RPC is initialised with a slot map IM that defines all the needed data channels. This must always contain a General Control data channel GC in slot 0 of the master bearer, but the rest of the map can be individually designed. This initial slot map can vary through three methods:
Extension
Reallocation
Reinitialisation Extension applies when some slots are unused in the initial configuration. Here, these spare slots (even a complete spare slave bearer) can be brought into use.

Reallocation applies when part of the slot map is changed. This involves closing down one (or more) data channels and creating a new one on the resulting spare slots.

Reinitialisation applies when the complete slot map is changed. A special control transmission is provided to warn mobiles of an imminent reinitialisation.

Mobile Initialisation

The initial slot map for the Mobile is always defined to contain a Control channel GC on Slot 0 of the Master Bearer. The mobile is also programmed with the actual frequency of the uplink of radio channel 1, the duplex channel separation, and the permissible range of transmit and receive radio channel numbers.

The initialisation process from cold is as follows (this process must always precede registration on a new RPC):

- The mobile scans all of the permissible receive frequencies and records the strongest RSSI values
- The mobile selects the link with the strongest RSSI, tunes to it, and tries to synchronise using the Downslot Trailer DST
- When it finds the trailer, it decodes the Frame Related Information and uses the contents to determine if this is the master bearer. If it is not, then the contents will indicate it is a slave bearer at a certain channel offset from the master. Therefore the mobile can immediately retune to the master bearer.
- When tuned to the master bearer, the mobile locates slot 0 by using the Frame Related Information as a timing reference. It assumes slot 0 contains General Control information, and starts decoding it.
- While decoding the slot 0 information, the mobile extracts the Colour Code (which is used to distinguish transmissions from overlapping RPCs) and stores it.
- The Colour Code must be present on all future receptions from this RPC, before they can be accepted by the mobile. They must also be used for all transmissions from the mobile to the RPC, and therefore the mobile is only required to store one Colour Code.

After successfully receiving the General Control Data, the mobile should have learned the following elements of the slot map:

i) The registration data channel REG for its primary ID;
ii) The down setup data channel for its primary ID;
iii) The down setup data channel for any secondary IDs (for Broadcast Packets only);
iv) The up setup data channel USU for its primary ID.

Of these, (i) and (ii) are mandatory, but (iii) and (iv) are optional. In particular, the mobile can postpone extraction of (iv) from the general control data channel until it requires to send an up packet.

Once a mobile has learned the slot map, it is not required to monitor the general control data channel unless it is notified of a change in one of its MGLs. This can happen in the following ways:

i) The specified group MGL is deleted.
ii) A reinitialisation control block (see Section 3) <INIT.0> or <INIT.1> is transmitted from the RPC ordering a group (or groups) of mobiles to relearn the map. Typically this will be inserted into the appropriate down setup data channel.

The <INIT.0> control block carries an added instruction for the mobiles concerned to reregister. Both <INIT.0> and <INIT.1> include a MGL specification, and all mobiles who have been allocated that MGL must respond as required. If a general control MGL is specified, then all mobiles must respond. The minimum reuse interval for all MGLs must be retained.

2.6 Radio Constraints on Protocol

Slots can be arranged very flexibly in order to suit particular traffic patterns, unforeseen changes in traffic pattern, or operational system requirements. There are probably several arrangements of slots which will suit initial requirements equally well.

The allocation of slots is subject to the following constraints.

i Each mobile operates in half duplex with a turnaround time of at least 2 slots, and a response time of at least 3 slots.

The turnaround time is defined as the interval (end-to-start) between any two receive or transmit operations. For example, the interval from receiving a general control data channel to receiving a down-setup data channel.

The response time is defined as the interval (end-to-start) between a receive and transmit operation where the mobile (or base) is expected to respond. For example, the interval from receiving a setup, to transmitting an ACK is defined by the response time. The response time is expected to be dominated by the post detection processing and decoding of the data.

Single slot, bi-directional data channels will always have an end-to-start interval of 3 slots, in order to satisfy the response time requirement at both the base and the mobile. However, for multiple slot data channels it is possible to use a data channel interval of 2 slots, assuming that the data transmitted in the last downlink slot of the data channel does not require a response to be transmitted in the first uplink slot (or vice versa).

ii The normal operating state of all mobiles is the low duty cycle (LDC) standby mode, where all relevant down-setup information can be accessed by only monitoring one slot each frame. Mobiles have the option of entering a Very low duty cycle (VLDC) mode, where all relevant down-setup information can be accessed by monitoring one slot every [v] frames.

iii The protocol is asymmetric, and it places most complexity into the RPC. All responsibility for the use of the slots resides in the RPC, and the mobiles are slaved to it. Thus, new features may be introduced at the RPC without requiring mobiles to be upgraded. Thus, data channel definitions other than those described herein may be provided by sole adaptation of the RPC.

2.7 Implementation of Typical System i All data channels will operate on a fixed pair of radio frequencies. This does not imply a normal duplex pair, but simply implies one transmit frequency and one receive frequency.

ii The mobile will operate in a half duplex mode which will allow one transmission period and one reception period each frame interval.

iii If a transmission occupies more than one slot in a frame, the slots must be adjacent. This implies that [1/1] slot transmissions (ACKs) from a mobile, when the transmission is confined to an adjacent set of slots but the individual ACKs may be transmitted in non-adjacent [1/4] subslots.

iv Mobiles will only be required to process one transfer data channel at any one time.

v Where messages are segmented and transmitted over several slots, the layer 3 control may only specify the first slot of the transmission, with any following slots being linked using the data channel pointer contained in the slot overhead.

vi An acknowledged transmission will always expect the acknowledgement to be returned within a period of one frame (i.e. in the next transmission period of the data channel).

2.8 Dynamic Slot Allocation

The Slot Allocator SA shown in FIG. 12 will allocate slots to bearers as a function of:
available resources
traffic demand.

Over a long timescale (tens of minutes) the slot allocation may need to change to reflect changes in user demand. For example, during an early morning period there may need to be a generous provision of registration capacity. Later in the day, this might be more effectively used for packet capacity. A method of dynamic allocation is therefore preferred to vary the capacity allocated to each data channel, although a fixed slot map could be used with capacity changes being managed by regrouping mobiles using the MGLs.

The Slot Allocator uses the data provided by the RMD in order to modify the system capacity, e.g. input queue lengths and the number of contention failures. The protocol specification supports dynamic modification of slot allocation, but the particular algorithm to be used is not part of the protocol. Any Dynamic slot allocation algorithms may be specified by the system operators.

When the base requires a change to the slot map to be adopted, it notifies all relevant mobiles by transmitting new control information. This may be done as part of the setup data channel, or by allowing mobiles to time-out so that they retune to the general control channel.

2.9 Retransmissions, ARQ and ACKs

Retransmission Strategy

A retransmission protocol, using error detection based on a 16 bit CRC code is used, to provide a guaranteed undetected error rate to layer 4. The actual undetected error rate will vary as a function of the radio link error rate; the CRC defines the absolute worst case.

The protocol primarily operates on a positive acknowledgement basis. If the CRC reports a transmission as error free, the receiver transmits an ACK. If an ACK is not received within the expected time, the transmitter should retransmit the data using a selective repeat plus go-back-N (SGB) retransmission strategy.

A negative acknowledgement is also defined (NACK); this can only be used when an expected transmission fails to appear in a predefined slot.

The principle of SGB is that a slot received in error is retransmitted selectively as an interruption in the normal sequence of transmission. If one of these retransmissions is also lost then a go-back-N procedure is applied from that point.

The protocol requires any implementation to always provide a minimum of one retransmission in all data channels (other than the contention data channels), so that the go-back-N aspects of the SGB procedure are not mandatory for mobile reception. Mobile transmit procedures are a fully slave process.

When invoked, the go-back-N procedure starts retransmissions from the missed slot, and includes all subsequent slots. The receiver will retain all slots which have already been successfully received, and only update those slots which have been missed.

Successful downslots are always individually acknowledged by the mobile (although one reply may individually acknowledge several slots), so that a retransmission is scheduled in the following circumstances:

an ACK is not received when expected
an ACK is missing from a sequence of ACKs
a NACK is received
a slot is unacknowledged after a timeout.

This retransmission scheme is used for all bi-directional data channels. ACKs are only not used for broadcasts (i.e. when transmissions are addressed to more than one mobile) such as general control information.

Successful upslots (or subslots) may not be individually acknowledged (this is optional). A mobile can imply success from the subsequent transmission orders it receives, and mobiles will always receive a positive acknowledgement of the complete message.

ACKs AND NACKs

An acknowledgement event is generated by the transmitter of a message in response to some data transmitted back to it by the receiver of the message. The event may be caused by an explicit or implicit ACK:

explicit means that the receiver transmits a message which means 'successful reception' (i.e. the CRC reported no errors);

implicit means that the receiver transmits some other message, but the content is such that it also can be inferred as a 'successful reception'.

Explicit ACKs are transmitted from receiver to sender in the form of one of the dedicated ACK control blocks (<ACK.0>, <ACK.1> and <ACK.2>). Examples of explicit ACKs include normal data transfer, when the acknowledgements specify exactly which slots have been received.

Examples of implicit ACKs are the response to a mobile registration, or the response to an uplink setup request, where the information content of the response clearly shows that the initial request has been received successfully.

A NACK refers to a negative acknowledgement message; it can be generated when the receiver detects a gap in the received TSI sequence. Note that a NACK cannot be generated when the receiver detects some error within a message destined for it because the receiver cannot assume any part of a received message is correct (in particular the mobile ID or the MGL) if the CRC validation fails.

The <ACK.1> and <ACK.2> control blocks enable the receiver to ACK or NACK several of the data slots expected or received so far in the transmission set. The mandatory requirement is for the receiver to acknowledge (ACK) all the successful slots transmitted in the last frame interval, but unlimited additional ACKs and/or NACKs are allowed. Note that this rule forces the message recipient to duplicate ACKs in multiple slot data channels, by reducing the risk of a retransmission being caused by a lost ACK.

2.10 Master Bearer

All RPCs will be required to allocate one and only one bearer to be the master bearer. The allocated bearer is indicated by the content of the Frame related information. This master bearer will always contain at least one slot of general control information in slot number 0.

The Master Bearer is expected to be the first point of contact for all mobiles, and it is recommended that master bearers are used by the mobile to make any registration decisions (i.e. which is the best base).

Note that master bearers are associated with RPCs. A base site can therefore have more than one master bearer, if it has multiple RPCs. The smallest RPC has only one bearer: by definition this is a master bearer.

3. LAYER 3—Control 3.1 Slot Data

Figure 15:
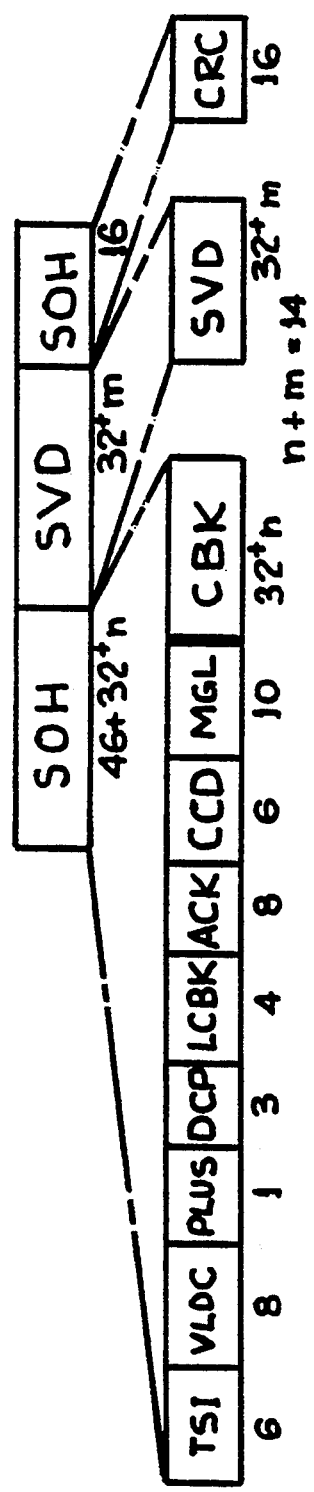

Slot data as shown in FIGS. 15 and 16 consists of:
Slot Overheads SOH
Service Data SVD Slot overheads contain control information such that the receiver can correctly interpret data which will be transmitted to it. The control information is specified in the following forms:
fixed overheads FOH
control blocks (variable overheads) CBK
cyclic redundancy check CRC The fixed overheads FOH contain a series of independent data elements that are all transmitted as part of every slot. This results in different arrangements between upslots and downslots and between slots and subslots.

The control blocks CBK are groups of whole octets which are used to supply additional control information depending on the current requirement. [1/1] slots can contain a variable number of control blocks. Control blocks have two different lengths specified in number of octets. For every control block, the length will be implied by the first octet which is a unique identifier. The number of control blocks may be varied as required, and the number of blocks actually being transmitted in the slot is specified as part of the fixed overheads.

The CRC is included in every slot, and is used for error detection.

Service data SVD contains data originated by the "user" of the radio protocol described herein.

3.2 Fixed Overheads

Figure 16A:
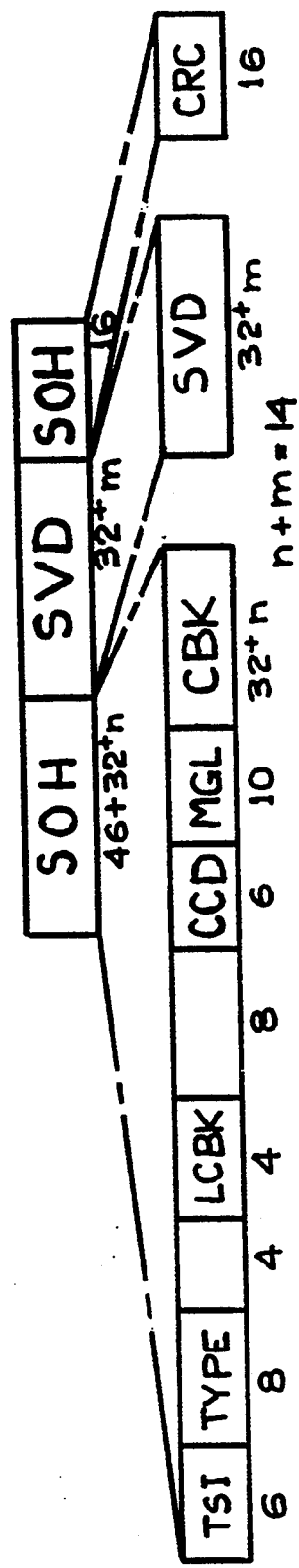
FIG. 16a to 16b shows the protocol layer 3 up slot contents.
Figure 16B:
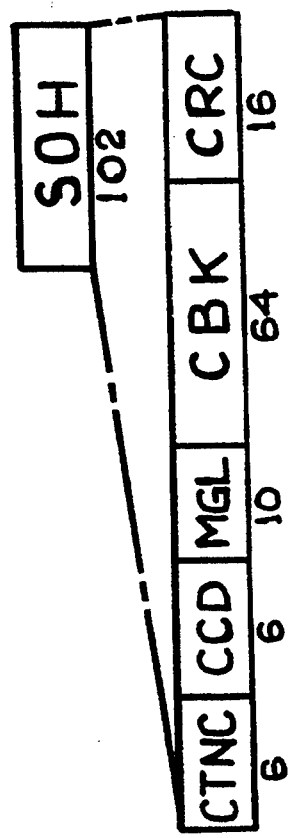

The fixed overheads FOH are defined as a bit-packed series of 46 elements for [1/1] slots, as shown in FIGS. 15 and 16a, and a bit-packed series of 22 elements for [1/4] subslots, as shown in FIG. 16b.

| Element | No. of bits |
|---|---|
| DOWNSLOT OVERHEADS [1/1] slot | |
| Mobile Group Label MGL | 10 |
| RPC Colour Code CCD | 6 |
| ACK mode ACK | 8 |
| Length (of Control Blocks) LCBK | 4 |
| Data Channel Pointers DCP | 3 |
| Plus | 1 |
| VLDC | 8 |
| Transmission Set Index TSI | 6 |
| UPSLOT OVERHEADS [1/1] slot | |
| Mobile Group Label MGL | 10 |
| RPC Colour Code CCD | 6 |
| Not used | 8 |
| Length (of Control Blocks) LCBK | 4 |
| Not used | 4 |
| Mobile Type TYPE | 8 |
| Transmission Set Index TSI | 6 |
| [1/4] slot | |
| Mobile Group Label MGL | 10 |

-continued

| Element | No. of bits |
|---|---|
| RPC Colour Code CCD | 6 |
| Contention counter CTNC | 6 |

3.3 Control Blocks

Control blocks will always precede user data, and they are defined in blocks of 8 or 4 octets, with the following structure:

| | |
|---|---|
| Octet 7 or 3 | Control block identifier (CBI) |
| Octets [6 ... 0] or [2 ... 0] | Control block information. |

There can be as many blocks as necessary in any particular transmission, consistent with the length of the service data and total slot length.

The CBI defines the following information:
Size of total control block (i.e. 8 or 4 octets)
Mandatory/Optional control block
The unique identify (label) of the control block.

Control blocks are defined in two classes, mandatory and optional. Mobiles must respond to mandatory blocks, but the response to optional control blocks is left to the individual implementation. These could be used for example to implement functions of a particular service which a particular user group subscribes to: these functions would be ignored by all mobiles not in that group.

3.4 Service Data

Service data SVD will be the unmodified information from the higher layers. If the information is insufficient to fill an exact number of slots then the last slot will be filled with the following padding octets:

Padding Octets: [00100000]; (ASCII Space)

The recipient of the message must use the Information Length parameter to define the true message length and to eliminate this padding before releasing the received packet. In a down packet, the information length is contained in the <FNN.0> control block. In an up packet, it is contained in the <SETUP.0> control block.

3.5 Message Segmentation

The radio system deals with small pieces of data, constrained by the size of the radio slots. These slots are deliberately chosen to be smaller than fixed network packets for two main reasons:

The radio design uses fixed length slots. Smaller slots are more efficient given the variable length of user packets;

The radio channel is subject to fading, and longer slots increase the risk of erasure.

This means that the RPC will usually be required to segment or split a downlink packet into a few pieces, and equally to assemble the pieces of an uplink packet before delivering it to the fixed network.

Examples of segmentation are given in the next sections.

Downlink Packet Segmentation

Figure 17:
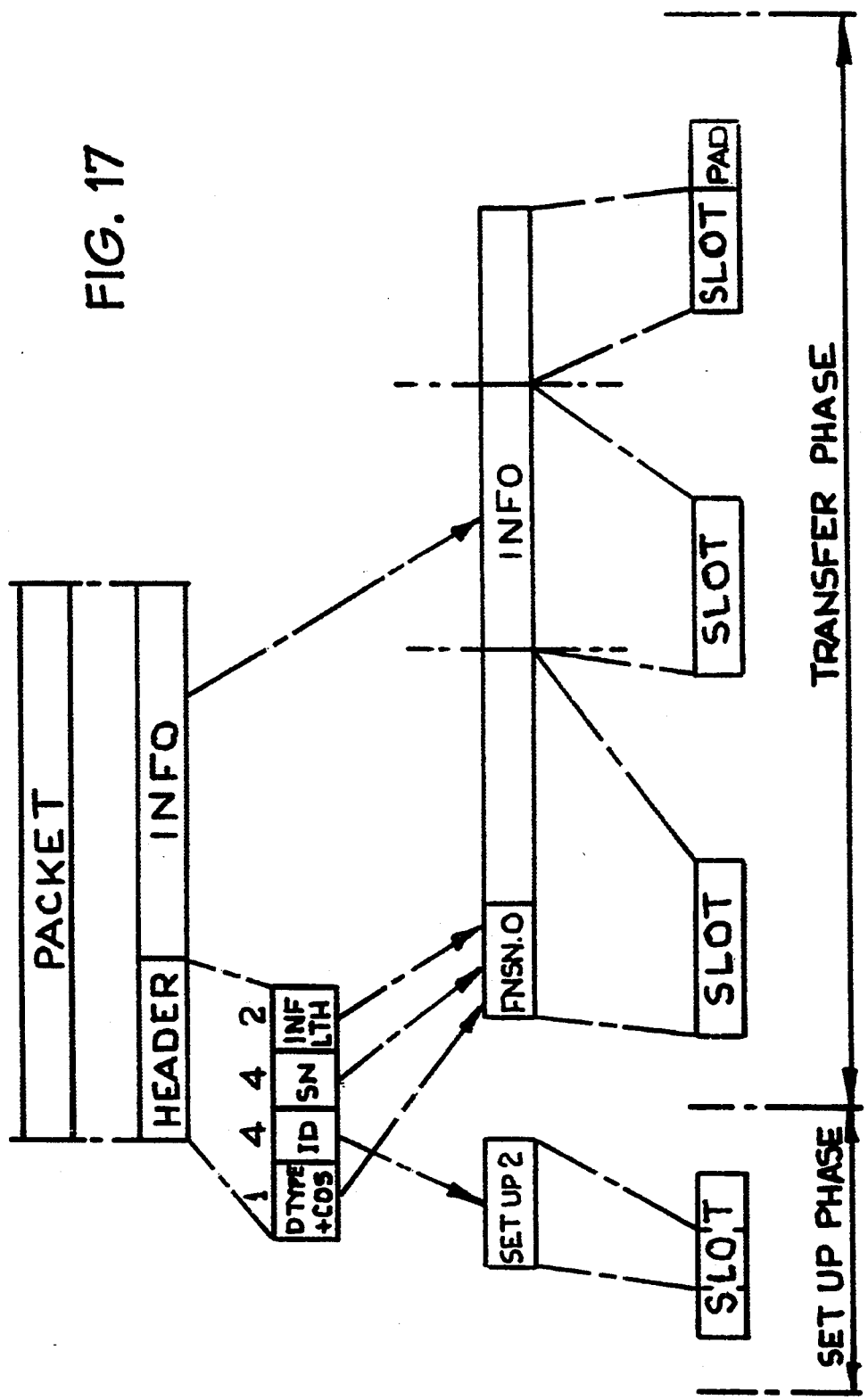

Downlink PACKETS as shown in FIG. 17 are used with data flowing from top to bottom.

The flow starts with the arrival of the PACKET. This contains individual fields as follows:

| | |
|---|---|
| Mobile ID | ID |
| SN (Sequence Number) | SN |
| Information Length | INF LTH |

The ID is separated into the setup transmission, where it is sent as an element in the <SETUP.2> control block. The setup also creates a new MGL, which will be used for all later transmissions, assuming the setup is successful.

The second radio slot contains the remaining parameters as elements in one control block, <FNSN.0>. The transmission of additional parameters can be easily achieved by the use of extra control blocks, provided that these are allowed for in the initial setup.

The second radio slot also contains the first octets of information. The rest of the information is sent in the remaining slots of the transmission set.

The radio slots are of fixed length, so that the final slot requires padding octets to fill out the slot.

Uplink Packet Assembly

Figure 18:
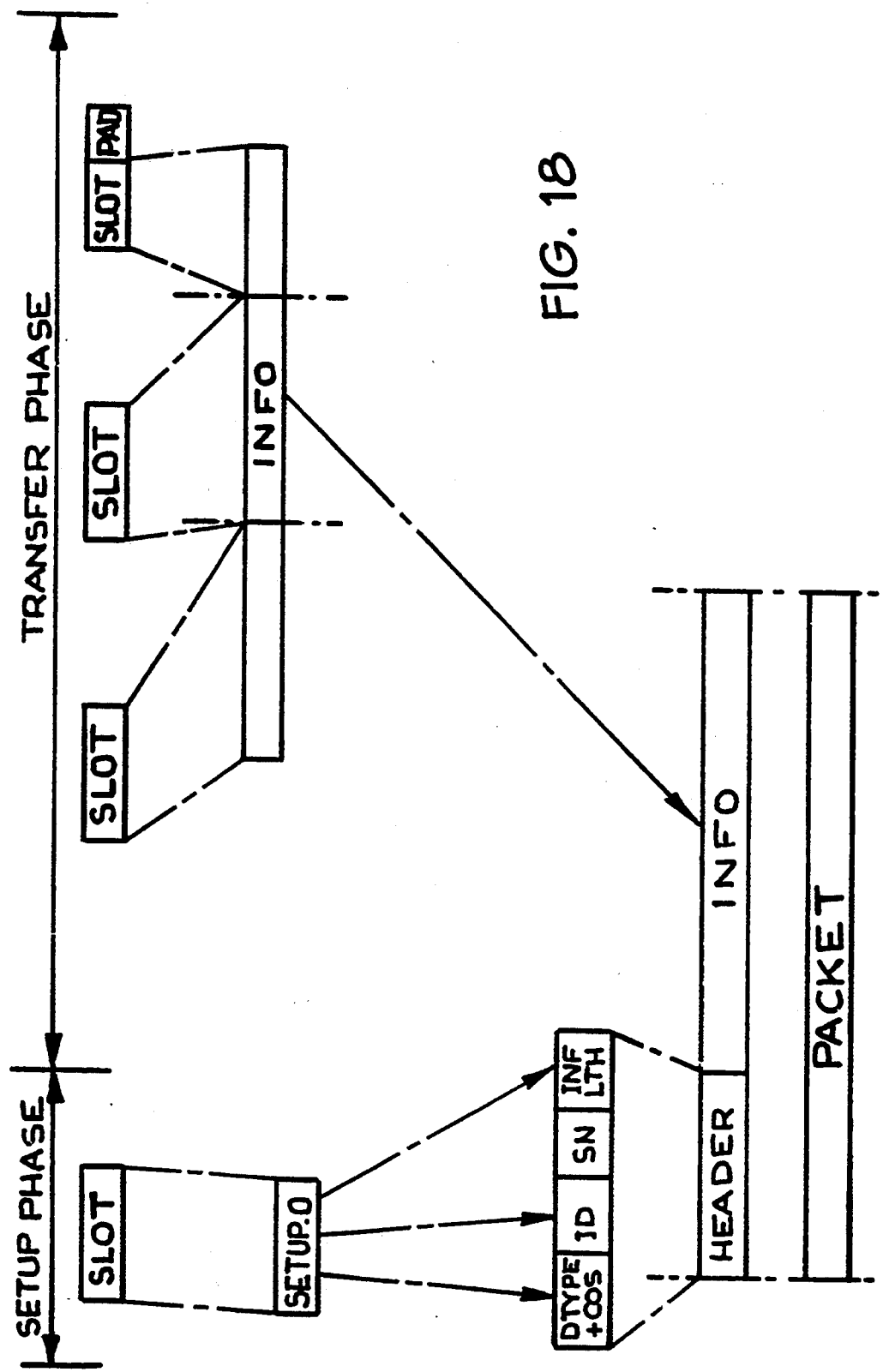

Uplink packets as shown in FIG. 18 are used with data flowing from top to bottom.

The flow starts with the arrival of a series of slots. The contents only are considered. The separation of the setup slot and the subsequent transfer slots are ignored.

The setup slot contains a single Control Block <SETUP.0>. This contains two parameters:

| | |
|---|---|
| Mobile ID | ID |
| Length of Information | INF LTH |

These are used to create a new MGL for reception of the complete packet.

Next the first packet transfer slot arrives. This can contain further control blocks if necessary, provided that these are allowed for in the initial setup.

The RPC now links the ID and Length parameters with the sequence number SN. These are combined with all the information octets INFO, after successful reception, into a complete packet for immediate delivery.

Note that the last radio slot in this example contains padding octets. This is required to fill the fixed length radio slot.

3.6 Mobile Group Labels (MGL)

MGLs are the short way of addressing a group of mobiles. MGLs allow a group of just one mobile or more than one up to the entire population, to be defined only once. All subsequent transmissions for this group of mobiles use the MGL, with a resultant saving in slot addressing overheads. Even an MGL for a single mobile gives a small efficiency gain as the MGL is shorter than the complete mobile-ID.

The MGL (together with the Colour Code) uniquely labels data to be sent to a group of mobiles at any one time. A small number of MGLs are predefined as 'general control' MGLs. Control information sent with these MGLs will always be directed at the entire population. All other MGLs are used for custom associations that are locally defined by the RPC.

If more than one RPC is located at the same base site, there are two options for the use of MGLs. In the first option, the RPCs have the same colour code and share a common pool of MGLs, i.e. any MGL is unique across the RPCs. In the second option, the RPCs each have a different colour code and independent pool of MGLs, i.e. the same MGL can exist simultaneously in the different RPCs. The choice between the two options is left to the individual implementation.

In all cases, when a set of data has been completely transmitted, the MGL can be reused for a new transmission set, and/or associated with a new group of mobiles. To avoid possible confusion, the MGL must not be reused sooner than a timeout.

The different associations of MGL with mobile group can last for widely different times. The 'general control' MGLs are effectively permanent. An MGL that relates to registration information for a group of mobiles will also be relatively long lasting. MGLs that are associated with a single mobile (e.g. for delivery of a datagram) will last only for the transmission of a few slots of data, plus any retransmissions.

Figure 19:
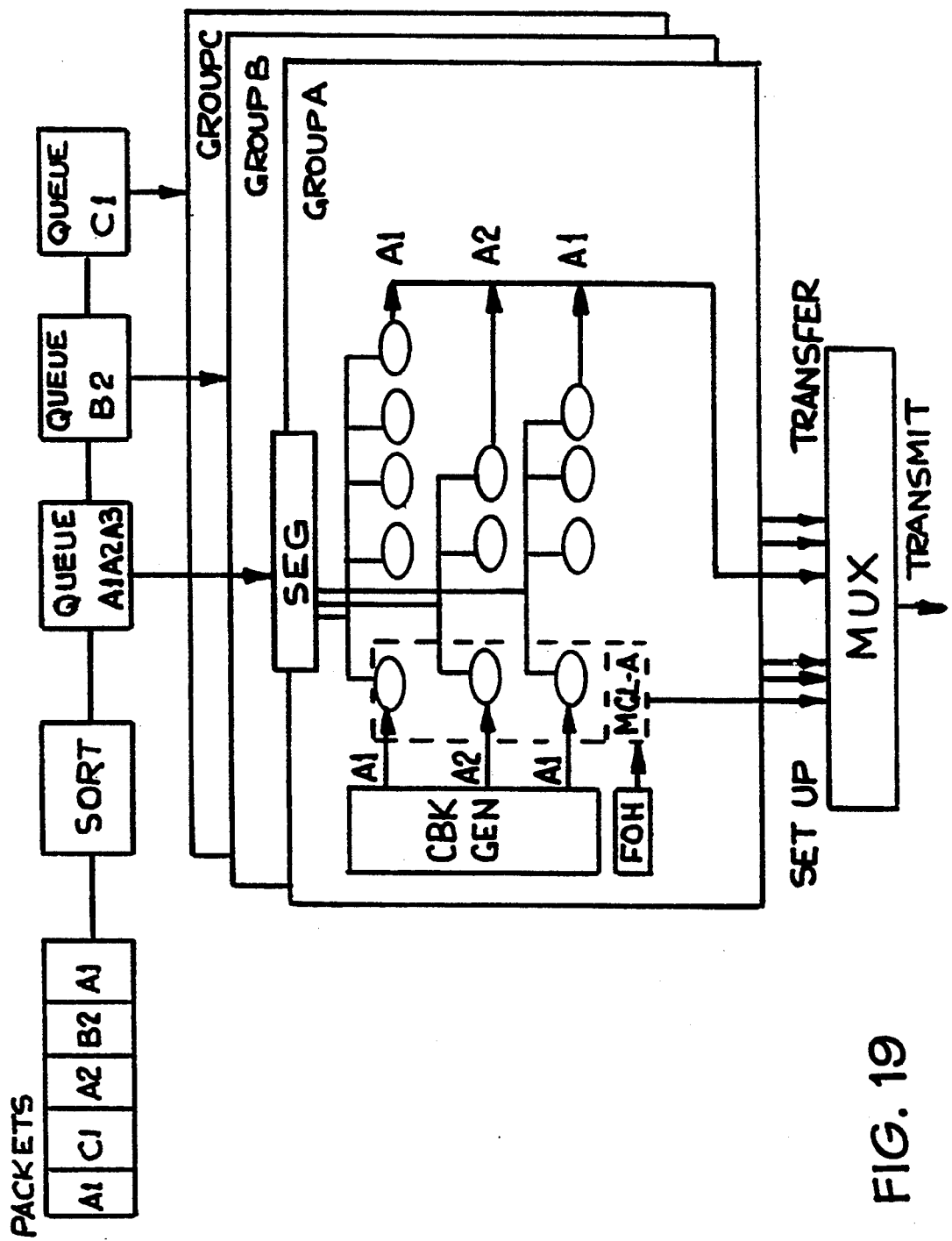

FIG. 19 shows an input queue of PACKETS, originating from the fixed network, which are associated with mobile groups A, B, and C by the RPC. The RPC maintains a queue QUEUE and segmentation SEG process for each mobile group. The group A process uses MGL-A to identify its setup data, which is common to all members of the group, and contained within the setup will be separate MGLs for each PACKET A1, A2, and A1 (again). The segmentation process is shown as being of different length for each packet; each component of the packet will be identified by these separate MGLs.

3.7 Transmission Sets

The protocol exists as series of phases, and each phase is made up of a set of slot transmissions to designated mobile groups. The set of transmissions includes those in the reverse direction where acknowledgements are required, and any retransmissions needed because of errors. Examples of transmission sets TS are:

Up transmission plus down acknowledge (e.g. up-packet transfer)

Down transmission plus up acknowledge (e.g. down-packet transfer).

In all cases, every transmission of the set will have the same MGL in the slot overhead, in the fixed overhead or in a control block, with individual transmissions being identified by an index number, the transmission set index (TSI). Retransmissions and acknowledges re-use the TSI.

A transmission set will usually consist of several slot transmissions. These transmissions can be interleaved with those of a TS for other mobiles or services. Each mobile is responsible for identifying and extracting all transmissions directed to it, using the MGL in the slot overhead to locate them. Note that a mobile may be interested in more than one TS. In particular, a mobile must always be prepared to extract a general control TS.

3.8 ACK Modes

The ACK modes are designed to minimise the chances of any acknowledged transmission being lost due to fading. The ACK modes follow the approach of the complete protocol by placing most of the complexity into the RPC, and requiring a mobile to remain slaved to the RPC once a transmission set has begun. In the event of a vital transmission being lost in a sequence of communications (e.g. an ACK from the mobile to the RPC for a down packet), the eventual action taken by a mobile is controlled by various time-outs. In general, the system is designed so that a few losses of a slot or subslot results in them being repeated as part of the current transmission set. Repeated failures result in the transmission set being abandoned, and in this event the complete message can be repeated as a new transmission set.

There is an optional mode that is used to increase the reliability of the [1/4] subslots that are used by the mobile to acknowledge a down setup or a down packet, since a loss of this short ACK transmission will cause retransmission of the complete setup or packet. For all moving, and some stationary mobiles, the probability of losing an ACK is minimised by allowing double ACKs to be used whenever the current data channel requirements allow it. The actual ACK mode for every mobile reply is defined on a slot-by-slot basis in the downslot overheads.

A duplex data channel always specifies the frequencies of the downlink and the uplink plus the position of the first downslot. The RPC is responsible for making sure that the size of the upslot and downslot allocations are matched.

Down Packet Example

The same two ACK modes apply to the down packet transfer channel. However, for down transfer channels the ACK mode is defined in the fixed overhead. At the time of reservation, the base will decide on the basis of current capacity requirements whether ACK mode 1 or 2 will be used. Two examples show the operation:

Assuming that a mobile has received data in the first slot of a data channel:
- with mode 1 (single ACK) specified, the mobile is ordered to send a single ACK in subslot 0 (or 1 or 2 or 3) of the specified slot.
- with mode 2 (double ACK) specified, the mobile is ordered to send two ACKs in subslots 0 and 2 (or 1 and 3).

The intricacies of sharing the upslots between two or more mobiles is left to the RPC. The mobiles should simply follow the ACK instructions received at all times.

Down Setup Example

A full downslot can carry a maximum of four setup messages to different mobiles. For setup, the ACK mode is not defined by the fixed overhead, but is defined by the individual setup control blocks. Assuming that the corresponding upslot allocated for mobile ACKs has its four [1/4] subslots numbered 0 to 3 in order of transmission, the following options apply:

The RPC specifies ACK mode 1 (single ACK). The mobiles concerned each send a single ACK in one of the [1/4] slots defined by their setup messages. Typically, this would mean that the mobile addressed in the first message sends its ACK in subslot 0, the mobile addressed in the second message sends its ACK in subslot 1, etc.

The downslot specifies ACK mode 2 (double ACK) The mobiles concerned send two ACKs each, in two of the [1/4] slots defined by their setup messages. These double ACKs are not sent in adjacent subslots, but in alternate subslots. Typically, this means that the mobile addressed in the first message sends its ACKs in subslots 1 and 3, etc.

Note that in mode 2, the mobile transmissions are not continuous but are still confined to a single full slot. This interruption in the transmission has the advantage of greatly increasing the chances of at least one ACK being received successfully by the RPC. More generally, a mobile can be ordered to acknowledge a multiple slot data channel with a varied selection of ACK modes. This can involve a discontinuous transmission of several [1/4] slots, although all these transmissions must be contained in a single data channel.

3.9 Creation of MGL Associations

An MGL is associated with the IDs of a group of mobiles using a control block such as <MGL.0>. The association uses a subset of the mobile ID bits, so that all members of a group must have identical bits for part of their ID. Thus the groups are not related to user groups, and are only used for subdivision of the population for control purposes.

3.10 Deletion of MGL Associations

MGLs are not explicitly deleted. Instead, they are implicitly deleted by one of the following methods:

| | |
|---|---|
| Completed | All the specified transmissions have been successfully received (i.e. including retransmissions) |
| Replaced | A new MGL association is created which will automatically supersede the previous one |
| Expired | A transmission set has not supplied any data within a period of time specified by a timer. |

"Completed" applies to packet transmission sets (or similar), where the expected length of the complete TS is specified at setup. The MGL remains in force until all transmissions have been successfully received (including all retransmissions) and terminates immediately after reception of the final acknowledgement.

"Replaced" could be used when a new arrangement of setup is wanted. A general control TS would be sent announcing the change, i.e. defining a new MGL for the old group IDs, and all mobiles would need to replace their old MGL associations (for setup) with new ones. In some situations, a reinitialisation control block may be used. This does not specify the new MGLs, but instead directs a specified group or groups back to the general control to learn their new MGL.

"Expired" could apply when a mobile has missed the general control TS described in 'Replaced' above. A little later the mobile would find itself receiving no information. The predefined timeout would cause it to delete its existing MGL association, forcing it to retune to the general control to discover the new MGL.

The up-setup and the registration data channels require special care by the RPC to ensure that old MGL associations are deleted efficiently. The preferred technique is to announce new associations in the appropriate down setup data channels and also to transmit the current (new) MGL associations in the up setup and registration data channels on a continuous but intermittent basis as traffic allows. Up-setup and registration transmissions from mobiles whose ID is not part of the current mobile group should always be ignored, and the resulting message failures will cause the mobile to return to general control.

3.11 Additional MGL Assocations

It is important to note that the control blocks in any TS can be used to provide information on any TS, including itself. For example, a control block could define "MGL crc will contain s slots". This association would be sent in the first transmission (TSI=1) on the general control data channel to define the total length of the control TS.

4. INTERACTIVE SESSION REQUIREMENTS

It may be desirable to connect mobile users into fixed information systems, in many cases to access existing applications. The traffic patterns of this type of use are different from those of the traditional use of mobile radio, and are not necessarily well-served by a message oriented protocol, since the main mode of use is for interactive sessions. In addition, the larger amounts of data which these applications may involve, means that the total traffic volume may predominate even though there may be fewer terminals.

Because of the varying mix of traffic which may arise, it is desirable to have a protocol which can cope with both messaging and interactive traffic efficiently. However, the exigencies of the radio medium mean that a connectionless network protocol is still to be preferred to a connection-oriented one.

Figure 20:
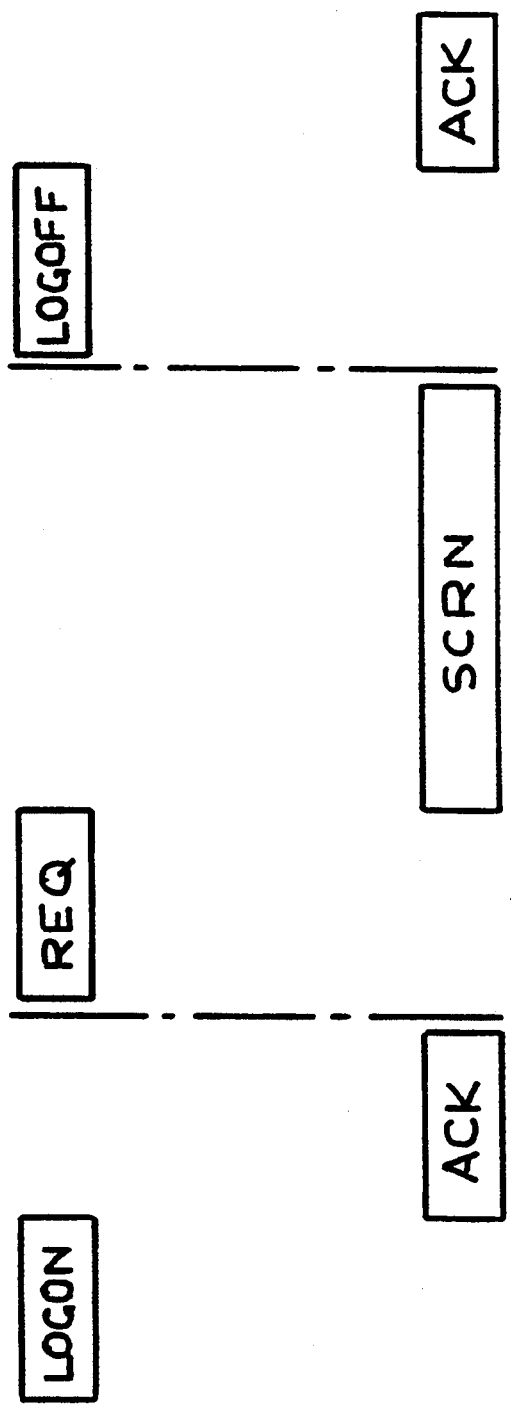

FIG. 20 shows diagrammatically a typical pattern of exchanging application messages in an interactive session. The session typically starts with a user logon request LOGON, and a host response ACK. The user then requests REQ, perhaps, a menu screen SCRN which the host provides; and this request and screen response may be repeated several times. All the request messages REQ from the user tend to be short, probably less than 250 characters, but the screens SCRN would typically be 1000 characters. The main point which emerges from examining this pattern of interaction is that the messages from the terminal user tend to be short, and could be handled by a single packet in a system according to the invention. Where longer messages arise, they are generally from the host, and would have to be segmented into several 256 octet packets by a transport layer.

The user is generally concerned to see a minimum time between sending a request to the host (normally this being triggered by his hitting the return key) and starting to see a response time of the application. The user is also concerned to see the screen filled quickly as well, but this is less important given that the response time is quick enough to give confidence the system is working.

It is therefore evident that the critical area of network performance determining response time is the delay between a packet entering the network from the host and becoming available to the application layers in the mobile terminal, given that the data volume is largest in this direction.

Figure 21:
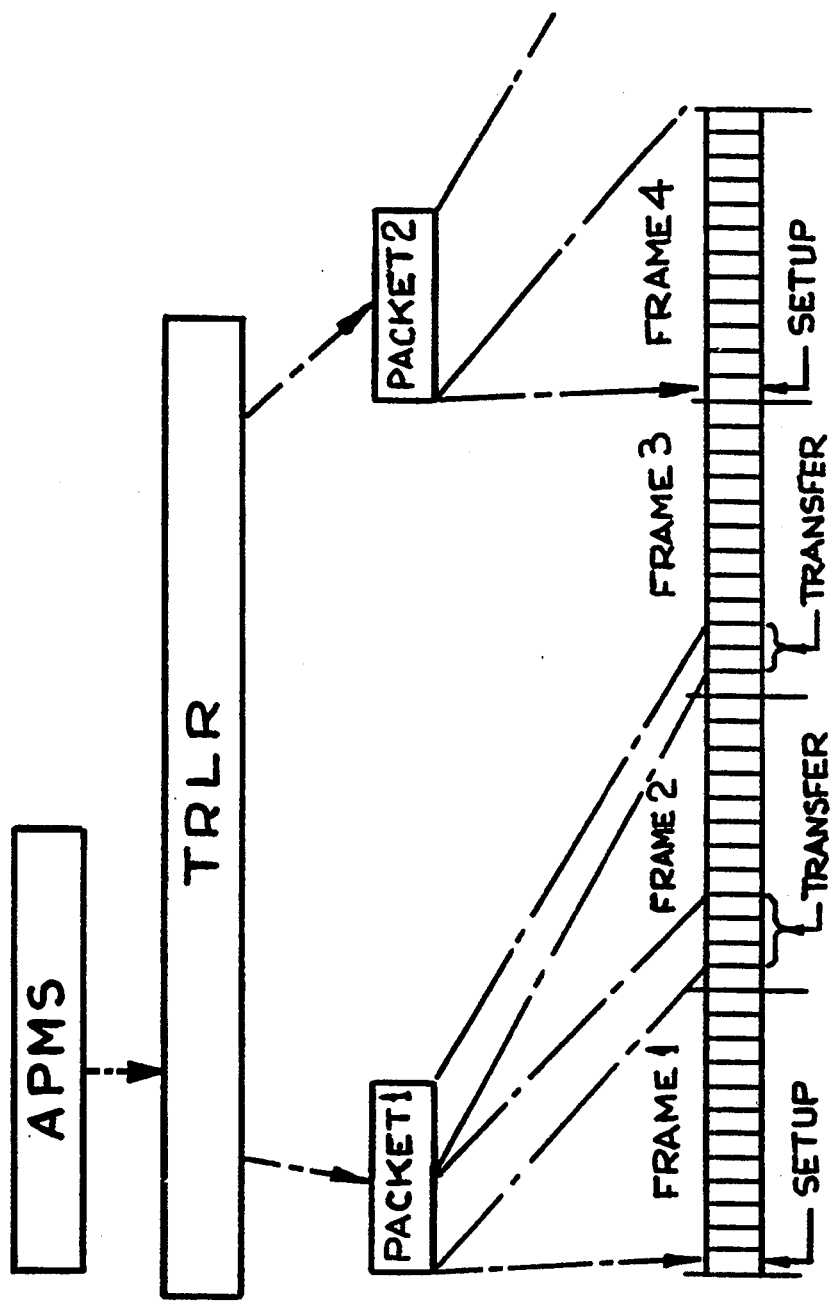

The messaging radio protocol outlined in Sections 1 to 3 above, though very efficient, is quite slow for interactive applications. The reason for this is shown in FIG. 21.

This shows the segmentation of an application message by a transport layer TRLR in the host into a sequence of datagrams (of which only the first two are shown).

Frame length is assumed to be 12 slots, or 1.5 seconds. It is assumed in this example that the slot map being operated allocates the second, third, and fourth timeslot of each frame to down transfer, and the first slot to down setup. 256 Octet packets are assumed to require 5 slots total to transfer.

As shown, the first packet PACKET 1 causes a setup in frame 1, then three slots of data transfer in frame 2, and two further slots in frame 3. Obviously the total time taken to transfer the first packet over the air is 3.375 seconds, of which 2.625 seconds is latent time, first between the setup and first transfer, then between the first and second transfer. To this total transfer time must be added an average of half a frame or 0.75 seconds between the arrival of the packet at the base and the beginning of the first slot. In congested conditions these times will be extended by queuing.

When considering the time taken to transfer the entire application message (i.e. to fill the screen), these times need to be multiplied by the number of packets involved. Overall, the response times become unacceptable for practical remote terminal applications.

By inspecting FIG. 21 it is evident that there are three items to be tackled to reduce the time taken to transfer a packet from the base to the mobile. Generally these concentrate on reducing the various latencies in the process.

First, the latencies are mainly determined by the frame length, and therefore this should be made as short as possible. The nominal frame length previously assumed in the protocol has been 2 seconds (16 slots), but the length is a parameter only needing to be fixed at implementation time. The shortest practical frame length is 10 slots, but a longer frame may overall be optimum.

Second, the data channels should be made wide enough so that a complete 256-octet packet can be transferred in a single frame to eliminate the time between the first and second transfers indicated in FIG. 21. Each slot transfers 56 octets, so that 5 slots are needed.

Finally, it is advantageous to introduce a new control mechanism into the protocol to eliminate the down-setup phase. This can be achieved by arranging that each time a request is made by the terminal application, a class-of-service bit is set which effectively allows the down-setup to be made in the acknowledgement which the base sends to the terminal once the request packet is received correctly.

Thus the down acknowledgement slot includes the terminal ID, a group mobile label allocated to the response which is to follow from the base, and data identifying the down transfer slots in which the response is to be transmitted. The base can then go straight into the data transfer phase, thereby expediting the delivery of the response and reducing the response time.

Further, where the response is long and divided into a number of separate messages, each individual message includes the relevant down-setup data for the next message so that the down-setup phase for each message is avoided.

Figure 22:
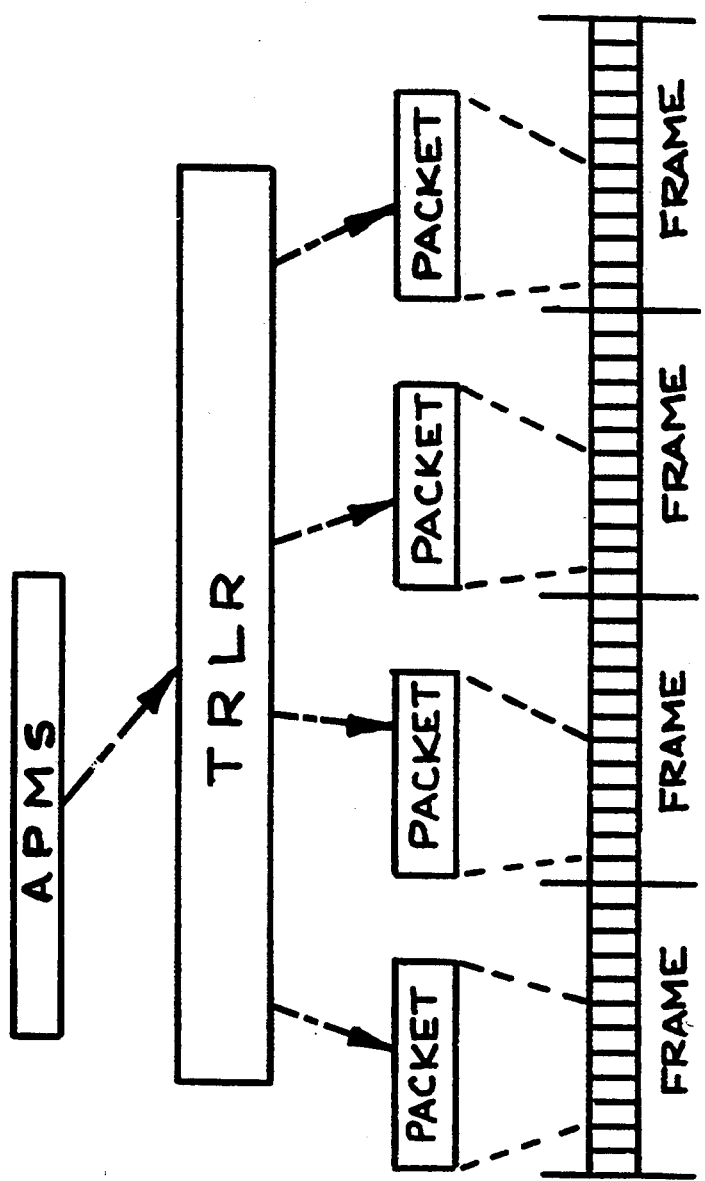

FIG. 22 shows the segmentation of an application message in which the above modifications have been made to improve the response time for the user.

We claim:

1. A method of communicating data over a radio based communication system between a base station and a plurality of remote stations comprising the steps of transmitting data between the base station and each remote station in a down link comprising one or more down frames of fixed duration; transmitting data between each remote station and the base station in an up link comprising one or more up frames of fixed duration; dividing each down frame into a fixed number of down slots at least one of which is a general control slot (GC), at least one other is a down-setup slot (DSU), at least one other is a down transfer slot (DTR), and at least one other is a down acknowledgement slot (ACK); providing control data in said general control slot (GC) to identify for each remote station (2) the down-setup slot (DSU) in which the base station (1) is to announce the transmission of data for each remote station; identifying in a down-setup slot at least one down-transfer slot (DTR) in which data for each remote station is to be transmitted to each remote station; transmitting data in said down-transfer slot to each remote station; dividing each up frame into a fixed number of up slots at least one of which is an up-setup slot, at least one other is an up-transfer slot, and at least one other is an acknowledgement slot; providing control data in said general control slot to identify for each remote station said up-setup slot; dividing the up-setup slot (USU) into a number of sub-slots; each remote station (2) wishing to transmit data to the base station (1) transmitting a reservation request in one of said sub-slots; the base station (1) responding to each such reservation request from a remote station by identifying in a down acknowledgement slot (ACK) at least one up-transfer slot in which each remote station (2) is to transmit data; and each remote station transmitting said data to the base station in said at least one up-transfer slot.

2. A method as claimed in claim 1 in which the base station (1) transmits data in a down acknowledgement slot (ACK) so as to identify a down transfer slot (DTR) of a following frame in which data is to be transmitted to a remote station (2).

3. A method as claimed in claim 1 in which the base station (1) transmits data in a down-transfer slot (DTR) so as to identify a down-transfer slot of a following frame in which more data is to be transmitted to a remote station.

4. A method as claimed in claim 1 in which a group label (MGL) and a transmission set index (TSI) are allocated by the base station to data transmitted in each down-transfer slot to a remote station so as to identify data in different slots that form part of a larger block of data, said remote station identifying said group labels and transmission set indexes of data in each of said plurality of slots received by it from the base station and using said group label and transmission set index to reassemble and verify the completeness of said larger block of data.

5. A method as claimed in claim 4 in which said group label (MGL) is identified in a down slot.

6. A method as claimed in claim 5 in which said group label (MGL) is identified in a down-setup slot (DSU).

7. A method as claimed in claim 1 in which there is a delay of a predetermined number of slots between receipt of data in a setup or transfer slot and transmission of data in a corresponding acknowledgement slot.

8. A method as claimed in claim 1 in which a remote station (2) whilst it has no data to send, is energised to receive only the down-setup slot (DSU) in each frame as identified by control data in the general control slot (GC).

9. A method as claimed in claim 1 in which the base station (1) uses a limited number of the down-setup slots (DSU) to transmit to a particular remote station (2), and said particular remote station (2) is energised to receive only this limited number of down-setup slots (DSU).

10. A method as claimed in claim 1 in which the number of up-setup slots (DSU) used is varied in accordance with the number of remote stations (2) transmitting requests.

11. A method as claimed in claim 1 in which synchronisation data (SYNC) is transmitted in every down slot to enable each remote station to locate each slot within a frame.

12. A method as claimed in claim 1 in which said down link and up link constitutes a master bearer of the radio based communication system, and in which another down link and another up link structured like those of the master bearer but without the general control slot (GC) constitute a slave bearer, synchronization data (SYNC) being transmitted in the down slots of a master bearer to enable a said at least one remote station to recognize the master bearer, and synchronization (SYNC) data being transmitted in the down slots of each slave bearer to enable a said at least one remote station (2) to retune to the master bearer.

13. A radio based communication system comprising a base station and one or more remote stations each incorporating a radio transmitter and receiver to support communication between the base station and each remote station on a down link and between each remote station and the base station on an up link, each link comprising a plurality of frames of fixed length divided into a fixed number of slots wherein the base station (1) includes base control means which transmits control data in a general control (GC) slot in each frame of the down link so as to identify to each remote station a down-setup slot (DSU) in each frame of the down link in which the base station (1) is to announce the transmission of data for each remote station to identify at least one down-transfer slot (DTR) in the frame of the down link in which said data for said remote station is to be transmitted to said remote station, the control data further identifying an acknowledgement slot (ACK) in each frame of the down link and an up-setup slot (USU) divided into sub-slots (1/4) in each frame of the up link, each remote station (2) including remote control means which transmits a reservation request to transmit data to the base station in any sub-slot (1/4) of the up-setup slot (USU) and receives corresponding data in the acknowledgement slot (ACK) of the down link to identify an up-transfer slot (UTR) in the up link in which it is to transmit data to the base station (1).

14. A method of communicating data over a radio based communication system between a base station and one or more remote stations comprising the steps of transmitting data between the base station and each remote station in a down link comprising one or more down frames of fixed duration; transmitting data between each remote station and the base station in an up link comprising one or more up frames of fixed duration; dividing each down frame into a fixed number of down slots at least one of which is a general control slot, and at least one other is a down-setup slot; providing control data in said general control slot to identify for each remote station the down-setup slot in which the base station is to announce the transmission of data for each remote station; dividing each up frame into a fixed number of up slots at least one of which is an up-setup slot; providing control data in said general control slot to identify for each remote station said up-setup slot; dividing said up-setup slot into a number of sub-slots; each remote station wishing to transmit data to the base station transmitting a reservation request in one of said sub-slots; each remote station receiving said control data in said general control slot to identify said down-setup slot and said up-setup slot, and thereafter receiving data in said down-setup slot only, at least, until directed by the base station to again receive control data in said general control slot.

* * * * *